United States Patent
Krishnamoorthy

(10) Patent No.: US 11,151,415 B2
(45) Date of Patent: Oct. 19, 2021

(54) PARAMETER ARCHIVAL ELECTRONIC STORAGE SYSTEM FOR IMAGE PROCESSING MODELS

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 131 days.

(21) Appl. No.: 16/531,879

(22) Filed: Aug. 5, 2019

(65) Prior Publication Data

US 2021/0042573 A1    Feb. 11, 2021

(51) Int. Cl.
G06K 9/62     (2006.01)
G06N 3/08     (2006.01)

(52) U.S. Cl.
CPC .......... *G06K 9/6256* (2013.01); *G06K 9/623* (2013.01); *G06K 9/6219* (2013.01); *G06N 3/08* (2013.01)

(58) Field of Classification Search
CPC .... G06K 9/6256; G06K 9/623; G06K 9/6219; G06N 3/08; G06N 3/02; G06N 7/046; G06N 20/00; G06T 3/4046; G06T 9/002
See application file for complete search history.

(56) References Cited

U.S. PATENT DOCUMENTS

| | | |
|---|---|---|
| 6,363,298 B1 | 3/2002 | Shin et al. |
| 6,449,612 B1 | 9/2002 | Bradley et al. |
| 6,512,995 B2 | 1/2003 | Murao |
| 6,920,458 B1 | 7/2005 | Chu et al. |
| 7,016,881 B2 | 3/2006 | Li et al. |
| 7,031,948 B2 | 4/2006 | Lee |
| 7,349,919 B2 | 3/2008 | Russell et al. |
| 7,516,115 B2 | 4/2009 | Gupta |
| 7,639,868 B1 | 12/2009 | Regli et al. |
| 7,689,572 B2 | 3/2010 | Chu et al. |
| 7,743,068 B2 | 6/2010 | Russell et al. |
| 7,769,763 B1 | 8/2010 | Bem et al. |
| 7,889,914 B2 | 2/2011 | Regli et al. |
| 8,209,271 B1 | 6/2012 | Lin et al. |
| 8,255,412 B2 | 8/2012 | Gao et al. |

(Continued)

OTHER PUBLICATIONS

NPL Dialog Search Strategy (Year: 2021).*

*Primary Examiner* — Nancy Bitar
(74) *Attorney, Agent, or Firm* — Michael A. Springs; Moore & Van Allen PLLC; Vaidehi Bachot

(57) ABSTRACT

Embodiments of the invention are directed to systems, methods, and computer program products for a parameter archival storage system for image processing models. The system is configured for read-optimized compression storage of machine-learning neural-network based image processing models with reduced storage by separately storing weight filter bits. The system is configured to construct weigh parameter objects associated with the plurality of neural network layers of an image processing model, such that the image processing model can be reconstructed from the weigh parameter objects. The system may discard the hierarchical linked architecture of the second image processing model and store the second image processing model at the at least one hosted model versioning system repository by storing only the weigh parameter objects.

20 Claims, 8 Drawing Sheets

(56) References Cited

U.S. PATENT DOCUMENTS

| | | |
|---|---|---|
| 8,364,613 B1 | 1/2013 | Lin et al. |
| 8,645,313 B1 | 2/2014 | Li et al. |
| 8,762,299 B1 | 6/2014 | Breckenridge et al. |
| 2003/0225719 A1 | 12/2003 | Juang et al. |
| 2005/0234753 A1* | 10/2005 | Pinto ............... G06Q 30/02 700/44 |
| 2010/0082507 A1 | 4/2010 | Ganapathi et al. |
| 2015/0170056 A1* | 6/2015 | Breckenridge ...... G06K 9/6227 706/12 |
| 2018/0232639 A1* | 8/2018 | Lin ..................... G06N 3/08 |

\* cited by examiner

PARAMETER ARCHIVAL ELECTRONIC STORAGE SYSTEM FOR IMAGE PROCESSING MODELS

FIELD OF THE INVENTION

The present invention generally relates to the field of machine-learning neural-network based image processing models. In particular, embodiments of the novel present invention provides a unique, electronic query engine for constructing a model abstraction layer configured for selection, mutation and construction of the image processing models. Moreover, embodiments of the invention also provide an electronic system for versioning machine-learning neural-network based image processing models and identifying and tracking mutations in hyper parameters amongst versions of image processing models. Additionally, embodiments of the invention provide a parameter archival storage system configured for read-optimized compression storage of machine-learning neural-network based image processing models with reduced storage, by separately storing weight filter bits.

BACKGROUND

Increasingly prevalent computers, mobile phones, smart devices, appliances, and other devices, require a variety of complex functions involving image processing, identification, pattern recognition, 3D image reconstruction, visualization, modelling, etc. However, these complex functions require complex processing capabilities that are not met by conventional systems. Machine learning or deep learning models are required for these tasks. There is a need for improved machine-learning neural-network based models that have the ability to learn and model non-linear and complex relationships, generalize and infer unseen relationships, and have the ability to handle a variety of inputs, thereby overcoming the deficiencies of conventional systems. The present invention provides solutions to various problems prevalent in neural-network based machine-learning technology.

The previous discussion of the background to the invention is provided for illustrative purposes only and is not an acknowledgement or admission that any of the material referred to is or was part of the common general knowledge as at the priority date of the application.

SUMMARY OF THE INVENTION

In one aspect, the present invention is directed to in general a system, method and computer program product for a parameter archival storage system for image processing models, a corresponding method, and computer program product. The system is configured for read-optimized compression storage of machine-learning neural-network based image processing models with reduced storage by separately storing weight filter bits. The system typically includes at least one hosted model versioning system repository comprising one or more image processing models stored thereon, wherein each of the one or more image processing models are configured for hierarchical processing of temporal image data via at least one convolutional neural network. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below.

In one embodiment, the system is configured to: receive, from a user device, a first user input to check-out a first image processing model from the at least one hosted model versioning system repository, wherein the first image processing model comprises a plurality of first convolutional neural network layers; extract the first image processing model of the one or more image processing models; receive, from the user device, a second user input associated with a request to store a second image processing model at least one hosted model versioning system repository; determine a hierarchical linked architecture associated with the second image processing model, wherein the hierarchical linked architecture comprises a sequential linked arrangement of a plurality of second convolution neural network layers associated with the second image processing model; construct weigh parameter objects associated with the plurality of second convolution neural network layers of the second image processing model, wherein the weigh parameter objects are constructed such that the second image processing model can be reconstructed from the weigh parameter objects; discard the hierarchical linked architecture of the second image processing model; and store the second image processing model at the at least one hosted model versioning system repository by storing only the weigh parameter objects; and present, on a display device of the user device, an indication that the second image processing model has been stored.

In another embodiment, and in combination with any of the previous embodiments, constructing weigh parameter objects associated with the second image processing model further comprises: extracting a first plurality of weights associated with the plurality of first convolutional neural network layers of the first image processing model; extracting a second plurality of weights associated with the plurality of second convolution neural network layers associated with the second image processing model; determining altered weights in the second plurality of weights that deviate from the corresponding first plurality of weights; mapping the altered weights in the second plurality of weights with the corresponding first plurality of weights and the corresponding plurality of first convolutional neural network layers; and constructing the weigh parameter objects for the second image processing model comprising the altered weights.

In another embodiment, and in combination with any of the previous embodiments, the system is configured to receive, from the user device, a third user input associated with selection of the constructed second image processing model for analysis. The system is further configured to: dynamically reconstruct the second image processing model by: extracting the weigh parameter objects, and mapping the weigh parameter objects with a stored hierarchical linked architecture of the first image processing model to construct the second image processing model; and present the dynamically reconstructed second image processing model on the display device of the user device.

In another embodiment, and in combination with any of the previous embodiments, storing the second image processing model at the at least one hosted model versioning system repository further comprises: mapping a first hyper parameter of the plurality of first convolutional neural network layers of the first image processing model with a second hyper parameter of the plurality of second convolution neural network layers associated with the second image processing model, based on determining that the second hyper parameter is a mutation of the original first hyper parameter; storing the second image processing model at the at least one hosted model versioning system repository by storing only (i) the weigh parameter objects, and (ii) the second hyper parameter.

In another embodiment, and in combination with any of the previous embodiments, the system is configured to receive, from the user device, a third user input associated with selection of the constructed second image processing model for analysis. The system is further configured to: dynamically reconstruct the second image processing model by: extracting the (i) the weigh parameter objects, and (ii) the mapped mutation in hyper parameters; and mapping the (i) the weigh parameter objects, and (ii) the mapped mutation in hyper parameters with a stored hierarchical linked architecture of the first image processing model to construct the second image processing model; and present the dynamically reconstructed second image processing model on the display device of the user device.

In another embodiment, and in combination with any of the previous embodiments, storing the second image processing model at the at least one hosted model versioning system repository further comprises: constructing a pointer link between the weigh parameter objects and a stored hierarchical linked architecture associated with the first image processing model.

In another embodiment, and in combination with any of the previous embodiments, the system is configured to perform training of the second image processing model.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
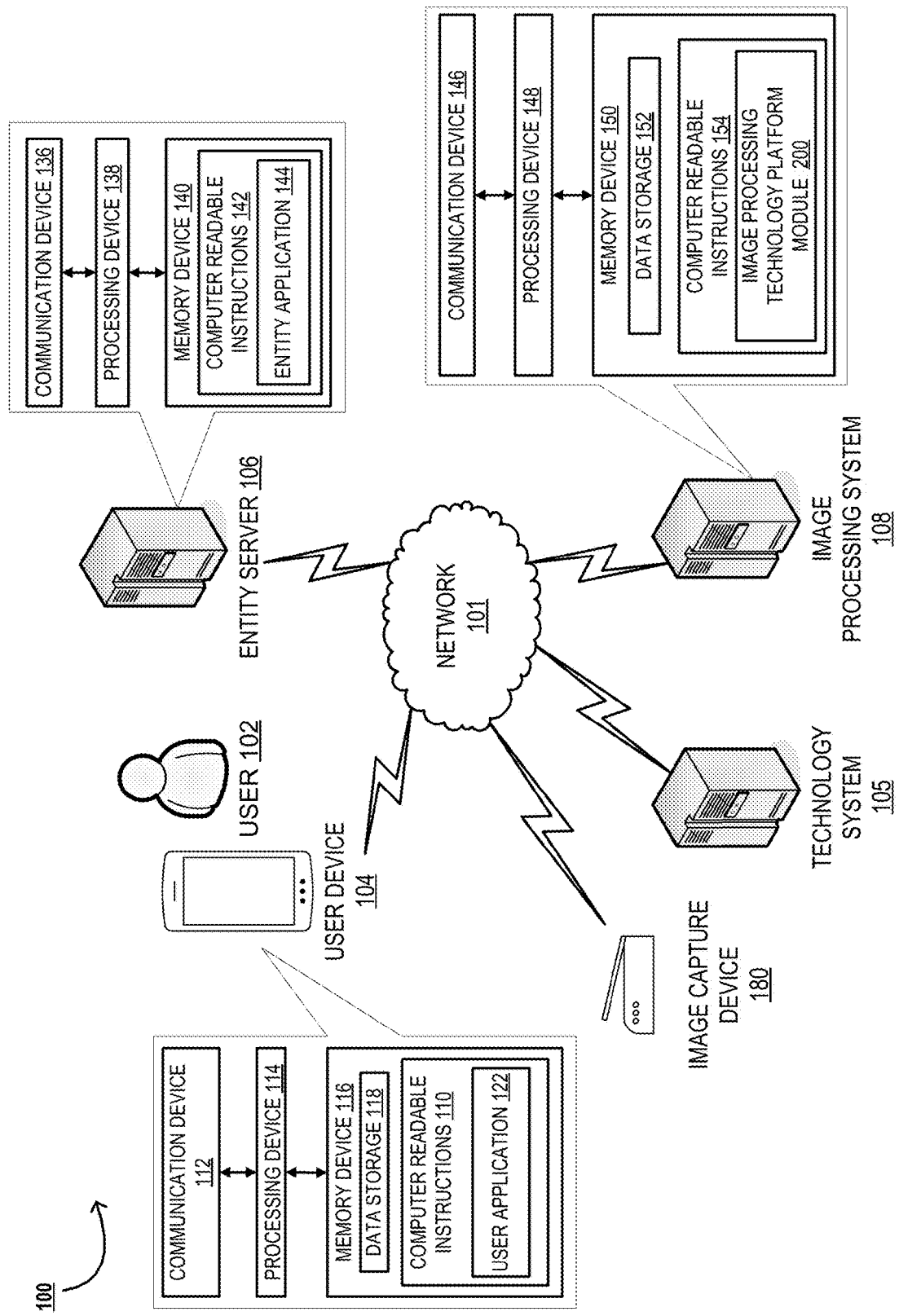
Figure 2:
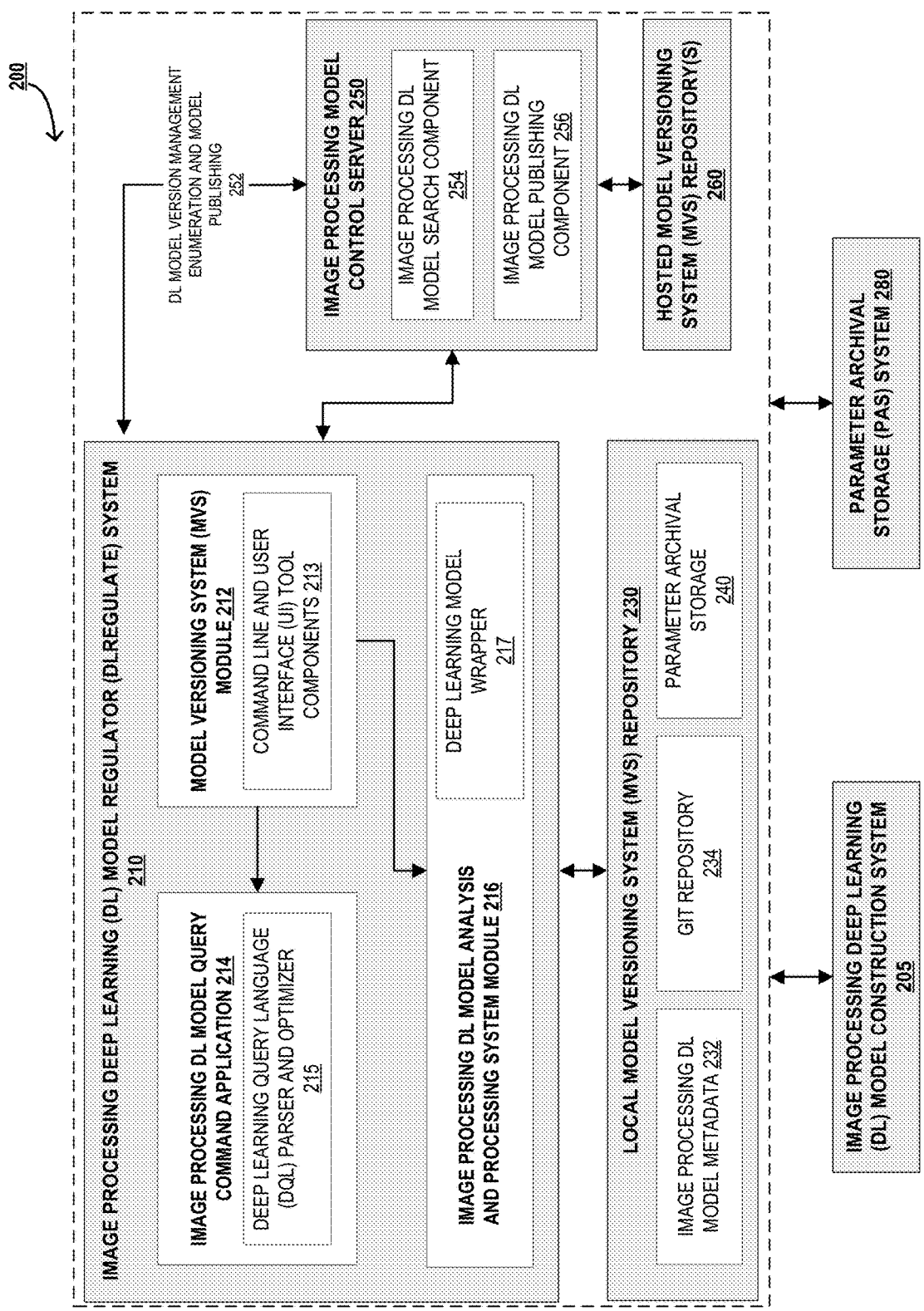
Figure 3:
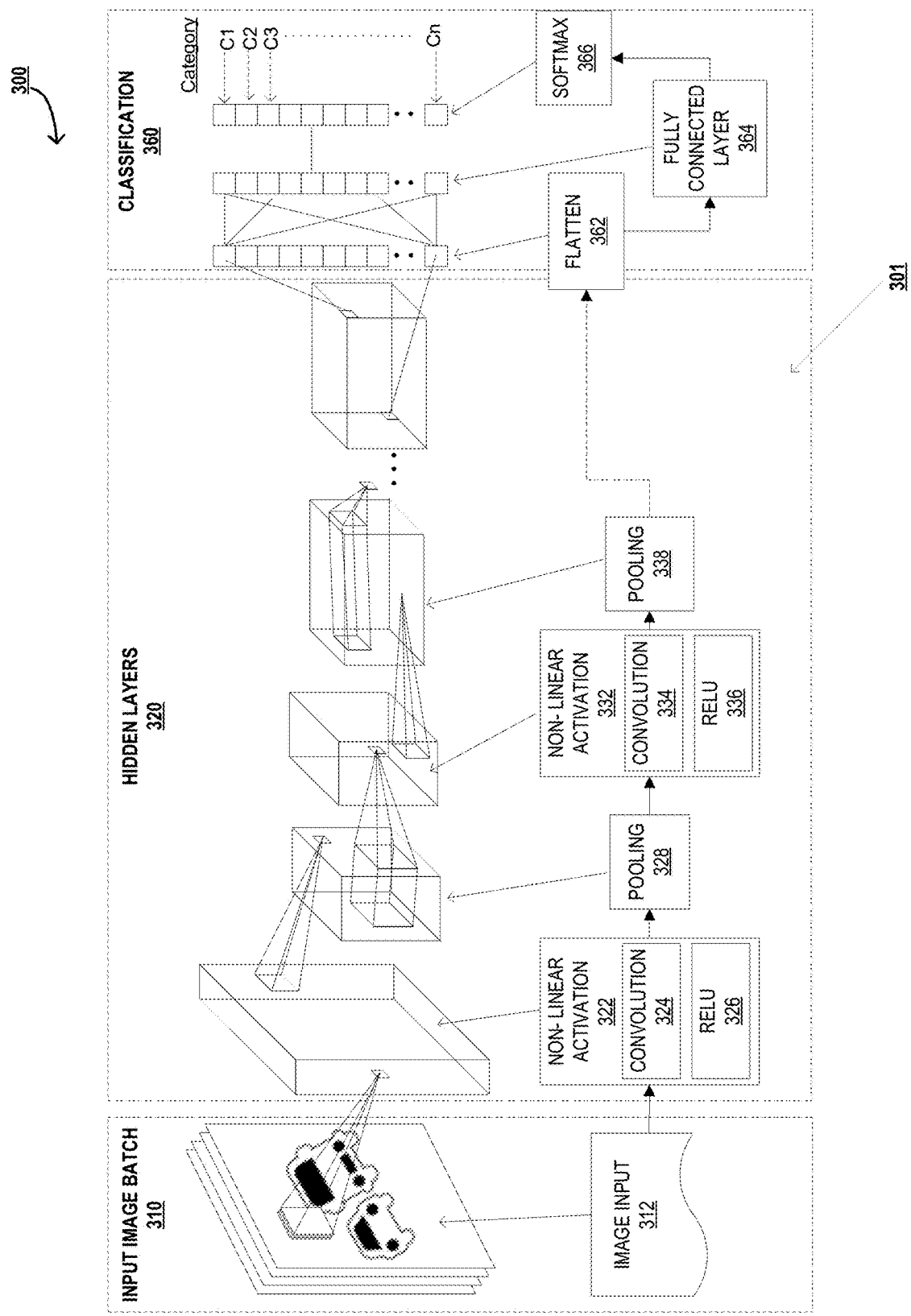
Figure 4:
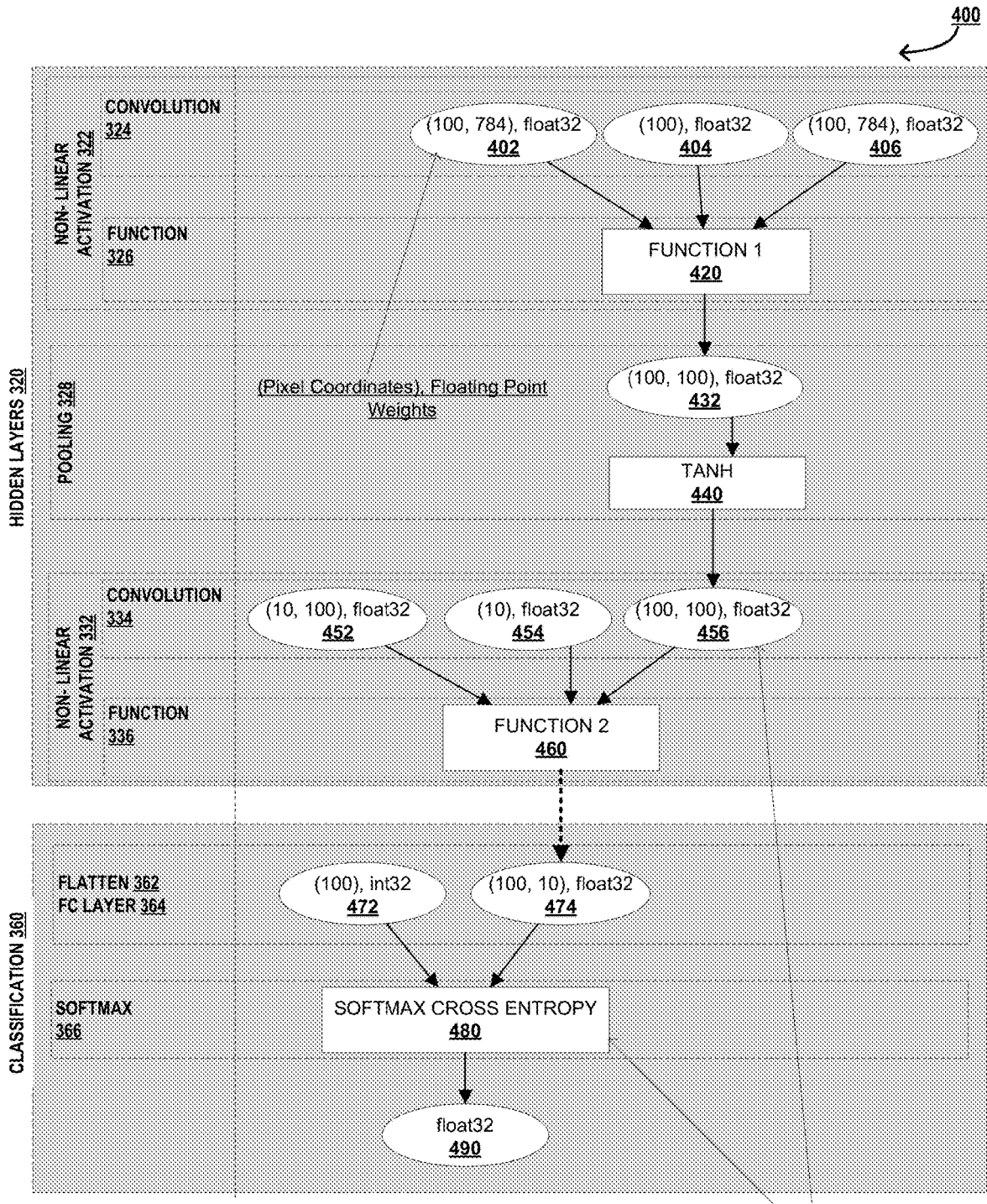
Figure 5:
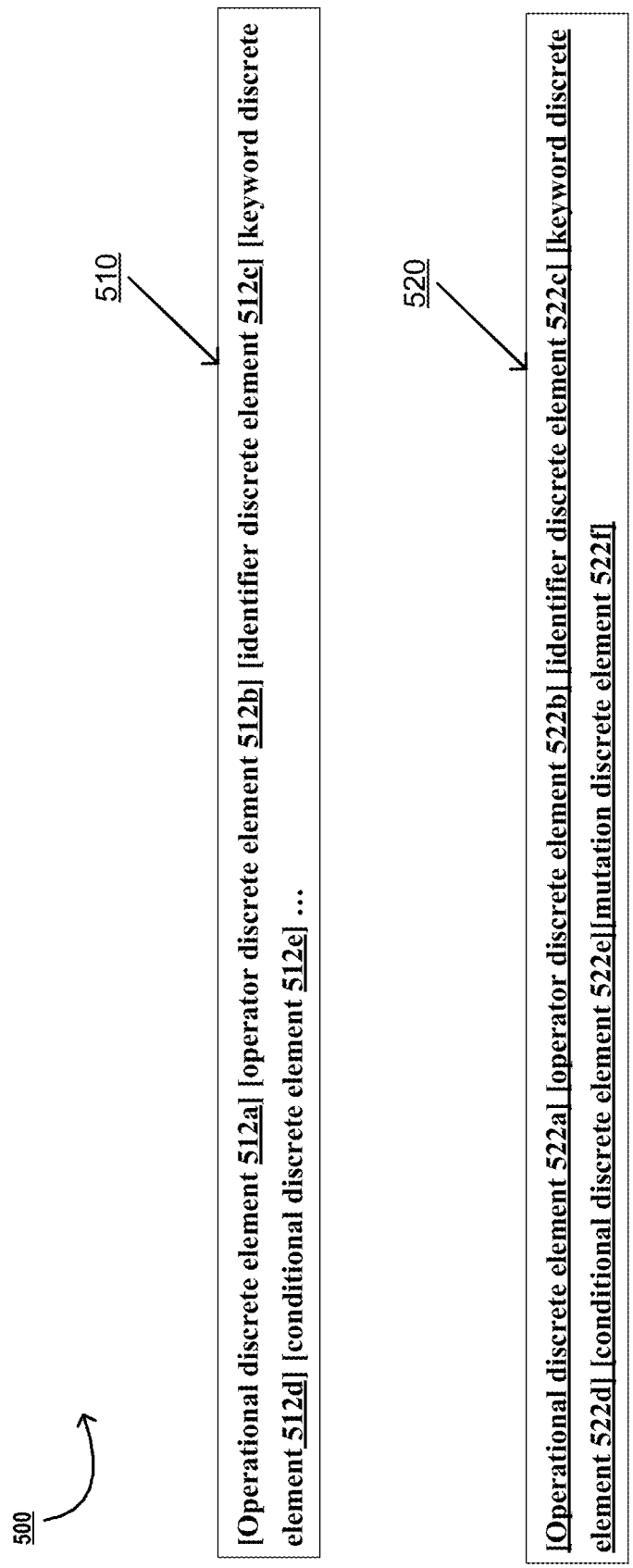
Figure 6:
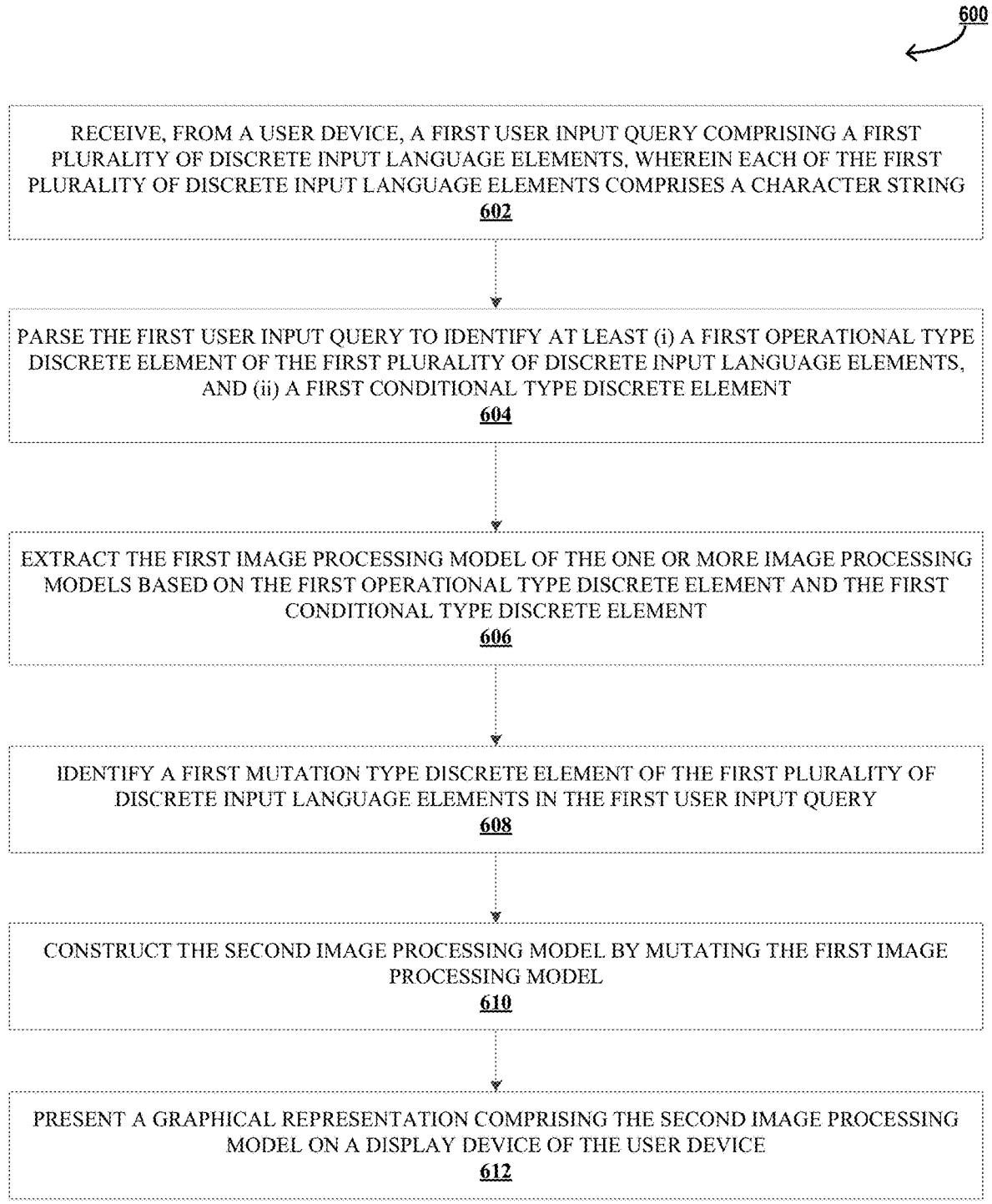
Figure 7:
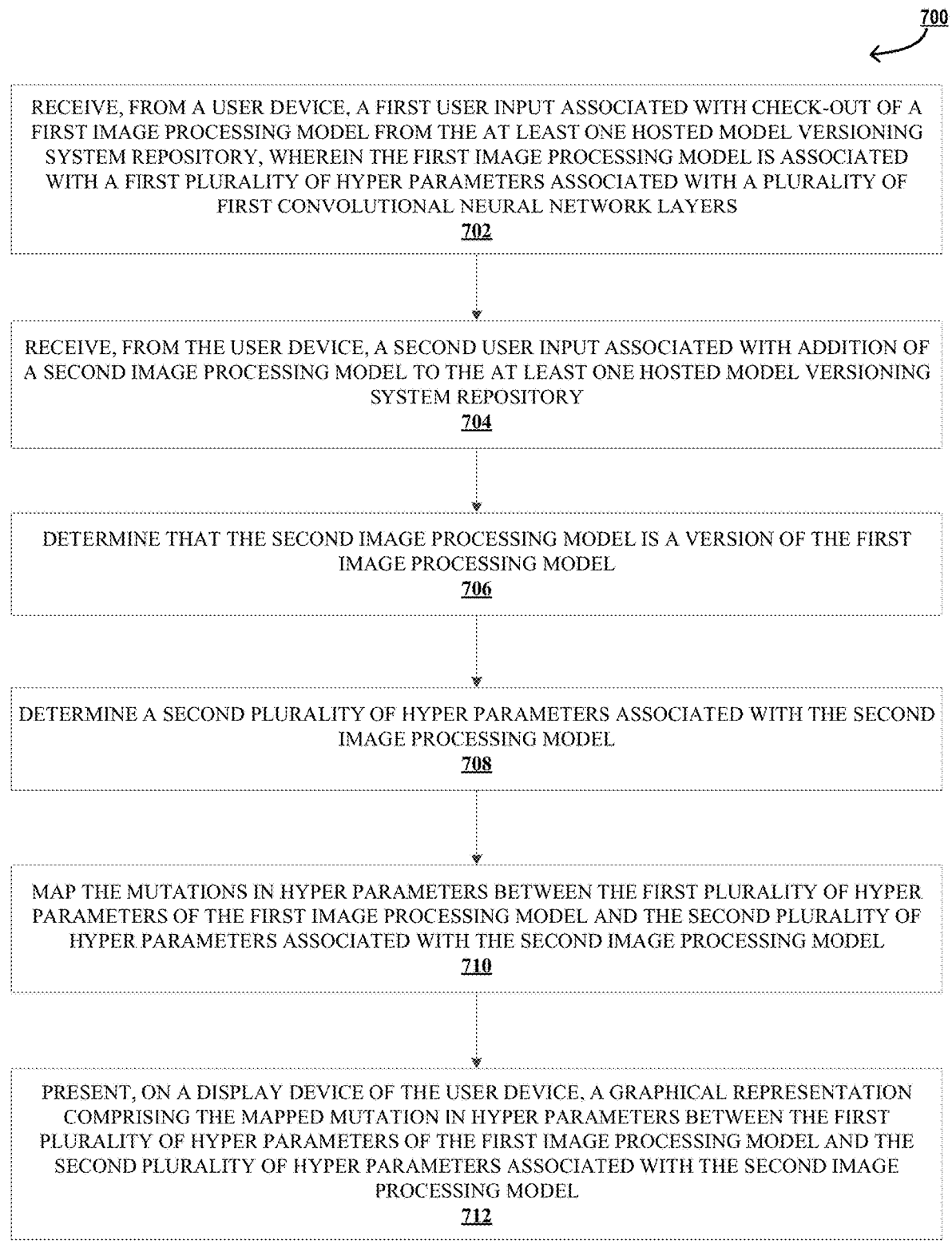
Figure 8:
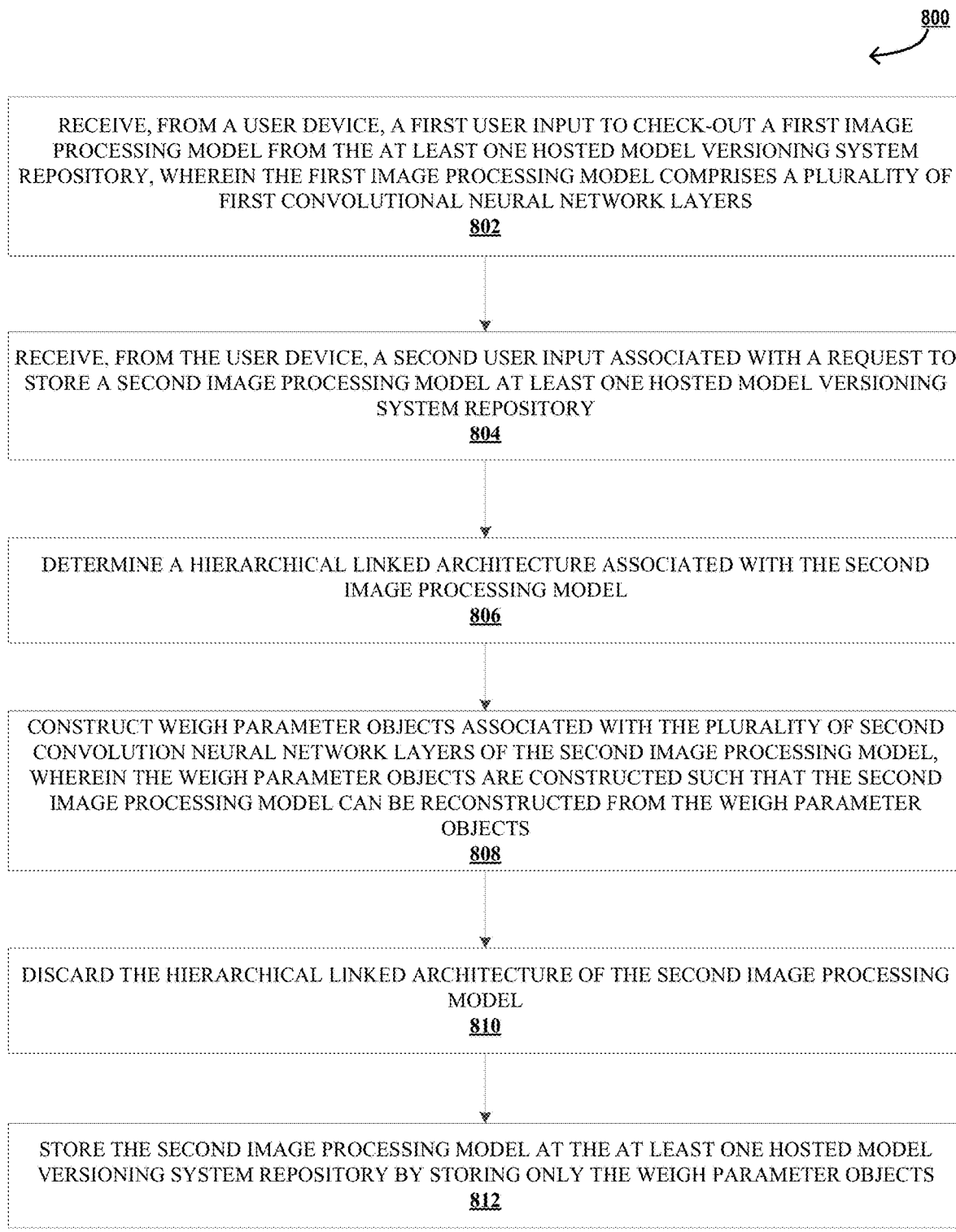

Having thus described embodiments of the invention in general terms, reference will now be made to the accompanying drawings, wherein:

FIG. 1 depicts an image processing model platform system environment 100, in accordance with one embodiment of the present invention;

FIG. 2 depicts an image processing technology platform module environment 200, in accordance with one embodiment of the present invention;

FIG. 3 depicts a schematic representation 300 of an image processing model 301, in accordance with one embodiment of the present invention;

FIG. 4 depicts an illustrative representation 400 of a structure of an image processing model 401, in accordance with one embodiment of the present invention;

FIG. 5 depicts an illustrative representation 500 of user input queries comprising a plurality of discrete input language elements, in accordance with one embodiment of the present invention;

FIG. 6 depicts a high level process flow 600 associated with an electronic query engine for an image processing model database, in accordance with one embodiment of the present invention;

FIG. 7 depicts a high level process flow 700 for management of image processing model database, in accordance with one embodiment of the present invention; and FIG. 8 depicts a high level process flow 800 associated with a parameter archival storage system for image processing models, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

As used herein, "image processing models," "deep learning models," and "machine learning models," (also referred to as neural-network machine learning image processing models) as used herein refer to programs and associated architecture of artificial neural networks, and may be employed interchangeably. Moreover, although described in the context of image processing, it is understood that embodiments of the invention are also compatible with and operate upon other deep/machine learning applications. In particular, the electronic query engine, the image processing technology platform module, the parameter archival storage system, image processing deep learning model regulator system, and other components of the present invention are compatible with and can operate upon any deep/machine learning model, and particular on any neural network based deep/machine learning model.

Increasingly prevalent computers, mobile phones, smart devices, appliances, and other devices, require a variety of complex functions involving image processing, identification, pattern recognition, 3D image reconstruction, visualization, modelling, etc. However, these complex functions require complex processing capabilities that are not met by conventional systems. Machine learning or deep learning models are required for these tasks. There is a need for improved machine-learning neural-network based models that have the ability to learn and model non-linear and complex relationships, generalize and infer unseen relationships, have the ability to handle a variety of inputs, thereby overcoming the deficiencies of conventional systems. The present invention, as illustrated by FIGS. 1-8 and as described herein, provides solutions to various problems prevalent in neural-network based machine-learning technology.

First, existing neural-network based machine-learning models, by their inherent structure itself (e.g., hidden layers, non-linear nature, constant changes due to learning based on inputs provided, etc.), consist of a "black box" type structure that necessarily obscures the neural network and makes interpretability of the neural network challenging. For instance, it is extremely arduous and unfeasible, if not impossible, for a user or even another system to ascertain why or how the neural-network arrived at a certain output, what the components (e.g., hyper parameters) of the neural network are, or what components caused a particular output (e.g., a defective output). Indeed, typically, neural networks themselves are not capable of identifying their own hyper parameters, because hyper parameters are provided/defined by a user during construction of the neural network. Moreover, with conventional neural-network based machine-learning technology, it is not possible to search the hierarchical linked architectures for neural network based image processing models stored in a repository, to identify models with certain parameters. It is typically not feasible or even possible for a user to interpret each and every element/component/function of the myriad hidden layers and other components of numerous neural network based models in a repository. Embodiments of the invention alleviate these defects, e.g., as described with respect to FIGS. 1-8 and particularly with respect to FIGS. 6-7. Specifically, embodiments of the invention are directed to an electronic query engine that provides a model abstraction layer over the neural network based image processing models. This model abstraction layer is structured for interrogation, selection, mutation and construction of the image processing models with reduced memory, time and processing requirement, using mere discrete input language elements typically in the form of natural language, and without requiring the user to interpret each and every element/component/function of the myriad hidden layers and other components. Moreover, the electronic query engine is also configured for image processing tasks such as segmentation and object detection, by generalizing model exploration and enumeration queries from commonly conducted tasks by machine/deep learning modelers.

Second, construction, training, and optimization of conventional neural network based machine-learning models, by their very nature, are extremely time consuming and computationally expensive, and also require large amounts of data for training and optimization purposes. Reducing the time spent in training and optimization and reducing the training data provided would result in inaccurate models. Typically, conventional neural-network based machine-learning technology does not allow leveraging existing models to alleviate the foregoing time and data requirements. Embodiments of the invention provide solutions to these problems, e.g., as described with respect to FIGS. 1-8 and particularly with respect to FIGS. 6-7. Specifically, embodiments of are directed to versioning machine-learning neural-network based image processing models, thereby allowing a user to mutate existing machine-learning neural-network based models for new/different/additional applications/purposes using mere discrete input language elements typically in the form of natural language, without requiring time consuming and computationally expensive construction of new models. Moreover, embodiments of the invention are also configured for identifying and tracking mutations in hyper parameters amongst versions of image processing models.

Third, neural network based machine-learning models typically have a complex architecture involving numerous interconnected layers, components and functions. Storing and managing (e.g., checking-in and checking-out, versioning, etc.) such complex neural network based machine-learning models and their artifacts is cumbersome, and requires large amounts of memory. Embodiments of the invention provide solutions to these problems, e.g., as described with respect to FIGS. 1-8 and particularly with respect to FIG. 8. Specifically, embodiments provide a parameter archival storage system configured for read-optimized compression storage of machine-learning neural-network based image processing models with reduced storage. Here, the parameter archival storage system is configured for determining and using deltas (e.g., mutated/altered weights filters) in the structure of neural network based machine-learning models. This novel storing system is configured for reducing/compressing the storage requirements for a neural network based machine-learning model from storing complex architecture involving numerous interconnected layers, components and functions, to storing mere floating point bits, providing data compression in the range of 100,000:1, 10,000:1, 1000:1, etc., without losing any accuracy of the model.

FIG. 1 illustrates an image processing model platform system environment 100, in accordance with some embodiments of the present invention. As illustrated in FIG. 1, an image processing system 108 is in operative communication with and operatively coupled to, via a network 10, a user device 104, an entity server 106, a technology system 105, and an image capture device 180. In this way, the image processing system 108 can send information to and receive information from the user device 104, the entity server 106, the technology system 105 and the image capture device 180. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, an image processing technology platform module 200 of the image processing system 108, is structured for an electronic query engine for constructing a model abstraction layer configured for selection, mutation and construction of the image processing models, an electronic system for versioning machine-learning neural-network based image processing models and identifying and tracking mutations in hyper parameters amongst versions of image processing models, and a parameter archival storage system configured for read-optimized compression storage of machine-learning neural-network based image processing models with reduced storage, by separately storing weight filter bits, which would not be possible in the absence of the present invention (e.g., in accordance with the process flows illustrated in FIGS. 6-8).

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide static UI images (e.g., via the image capture device 180), e.g., for model training, request selection and check-out of image processing models, input queries for search and selection of models, initiate mutation of models, view displayed models, etc. As such, in some embodiments, the user 102 may be associated with the entity and/or a financial institution.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 generally comprises a communication device 112, a processing device 114, and a memory device 116. The user device 104 is typically a computing system that is configured to enable user and device authentication for access to technology event data, request construction of UIs, receive the constructed UIs, etc. The processing device 114 is operatively coupled to the communication device 112 and the memory device 116. The processing device 114 uses the communication device 112 to communicate with the network 101 and other devices on the network 101, such as, but not limited to, the entity server 106, the image processing system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the image processing system 108 and/or the entity system 106 are configured to cause the processing device 114 to execute the computer readable instructions 110, thereby causing the user device 104 to perform one or more functions described herein, for example, via the user application 122 and the associated user interface of the user application 122.

FIG. 1 also illustrates an image capture device 180. In some embodiments, the image capture device 180 is typically configured to capture a 2-D image of a physical, tangible object, thereby converting it into an electronic file/document. The image capture device 180 may be/or may comprise, for example, a scanner, a camera, a light sensor, a magnetic reader, and/or the like. In some embodiments, the image capture device 180 is a part of, or is integral with the image processing system 108. In some embodiments, the image capture device 180 is a part of, or is integral with the entity server 106. In some embodiments, the image capture device 180 is a part of, or is integral with the user device 104.

As further illustrated in FIG. 1, the image processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, an image processing DL Regulator system 210 (having a model versioning system (MVS) module 212, an image processing DL model query command application 214, an image processing DL model analysis and processing system module 216, etc.), a local model versioning system (MVS) repository 230 (having image processing DL model metadata 232, git repository 234, parameter archival storage 240, etc.), an image processing model control server 250 (having image processing DL model search component 254, Image processing DL model publishing component 256, etc.), hosted model versioning system (MVS) repository(s) 260, an image processing deep learning (DL) model construction system 205, as well as a parameter archival storage (PAS) system 280 of the image processing technology platform module 200 (illustrated in FIG. 2), based on computer-readable instructions thereof, which may be stored in a memory device, for example, executing computer readable instructions 154 or computer-readable program code 154 (computer executable instructions) stored in memory device 150 to perform one or more functions associated with an image processing technology platform module 200.

The processing device 148 is operatively coupled to the communication device 146 and the memory device 150. The processing device 148 uses the communication device 146 to communicate with the network 101 and other devices on the network 101, such as, but not limited to the entity server 106, the technology system 105, the image capture device 180 and the user system 104. As such, the communication device 146 generally comprises a modem, server, or other device for communicating with other devices on the network 101.

As further illustrated in FIG. 1, the image processing system 108 comprises the computer-readable instructions 154 stored in the memory device 150, which in one embodiment includes the computer-readable instructions 154 of the image processing technology platform module 200. In some embodiments, the computer readable instructions 154 comprise executable instructions associated with the image processing DL Regulator system 210 (having the model versioning system (MVS) module 212, the image processing DL model query command application 214, the image processing DL model analysis and processing system module 216, etc.), the local model versioning system (MVS) repository 230 (having the image processing DL model metadata 232, git repository 234, parameter archival storage 240, etc.), the image processing model control server 250 (having image processing DL model search component 254, Image processing DL model publishing component 256, etc.), the hosted model versioning system (MVS) repository(s) 260, the image processing deep learning (DL) model construction system 205, and/or the parameter archival storage (PAS) system 280 of the image processing technology platform module 200 (e.g., as illustrated in FIG. 2), wherein these instructions, when executed, are typically configured to cause the applications or modules to perform/execute one or more steps described herein (e.g., with respect to FIGS. 2-7). In some embodiments, the memory device 150 includes data storage 152 for storing data related to the system environment, but not limited to data created and/or used by the image processing technology platform module 200 and its components/modules. The image processing technology platform module 200 is further configured to perform or cause other systems and devices to perform the various steps in processing electronic records, as will be described in detail later on.

As such, the processing device 148 is configured to perform some or all of the steps described throughout this disclosure, for example, by executing the computer readable instructions 154. In this regard, the processing device 148 may perform one or more steps singularly and/or transmit control instructions that are configured to cause the image processing DL Regulator system 210, the local model versioning system (MVS) repository 230, the image processing model control server 250, the hosted model versioning system (MVS) repository(s) 260, the image processing deep learning (DL) model construction system 205, and/or the parameter archival storage (PAS) system 280 associated with the image processing technology platform module 200 (e.g., as illustrated in FIG. 2), entity server 106, user device 104, and technology system 105 and/or other systems and applications, to perform one or more steps described throughout this disclosure. Although various data processing steps may be described as being performed by the image processing technology platform module 200 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the image processing system 108 may include multiple systems, servers, computers or the like maintained by one or many entities. FIG. 1 merely illustrates one of those systems 108 that, typically, interacts with many other similar systems to form the information network. In one embodiment of the invention, the image processing system 108 is operated by the entity associated with the entity server 106, while in another embodiment it is operated by a second entity that is a different or separate entity from the entity server 106. In some embodiments, the entity server 106 may be part of the image processing system 108. Similarly, in some embodiments, the image processing system 108 is part of the entity server 106. In other embodiments, the entity server 106 is distinct from the image processing system 108.

In one embodiment of the image processing system 108, the memory device 150 stores, but is not limited to the image processing technology platform module 200, as will be described later on with respect to FIG. 2. In one embodiment of the invention, the image processing technology platform module 200 may be associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the image processing technology platform module 200 may also instruct the processing device 148 to perform certain logic, data processing, and data storing functions of the application.

The processing device 148 is configured to use the communication device 146 to receive data, receive requests/user queries, and the like. In the embodiment illustrated in FIG. 1 and described throughout much of this specification, the image processing technology platform module 200 may perform one or more of the functions described herein, by the processing device 148 executing computer readable instructions 154 and/or executing computer readable instructions associated with one or more application(s)/devices/components of the image processing technology platform module 200.

As illustrated in FIG. 1, the entity server 106 is connected to the image processing system 108 and may be associated with may be associated with model training images, may be associated with a financial institution network, etc. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the image processing system 108. The image processing system 108 may communicate with the entity server 106 via a secure connection generated for secure encrypted communications between the two systems for communicating data for processing across various applications.

As further illustrated in FIG. 1, in some embodiments, the image processing model platform system environment 100 further comprises a technology system 105, in operative communication with the image processing system 108, the entity server 106, and/or the user device 104. Typically, the technology system 105 comprises a communication device, a processing device and memory device with computer readable instructions, which may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates the UI technology platform module environment 200 for (i) an electronic query engine for constructing a model abstraction layer configured for selection, mutation and construction of the image processing models, (ii) an electronic system for versioning machine-learning neural-network based image processing models and identifying and tracking mutations in hyper parameters amongst versions of image processing models, and (iii) a parameter archival storage system configured for read-optimized compression storage of machine-learning neural-network based image processing models with reduced storage. In some embodiments, computer readable instructions 154, when executed by the processing device 148 of the image processing system 108 (hereinafter referred to as "the system") (depicted in FIG. 1), are typically configured to cause the modules, applications, and other components of the technology platform module environment 200 to perform one or more functions as described herein. The image processing technology platform module 200 typically comprises an image processing DL Regulator system 210, a local model versioning system (MVS) repository 230, an image processing model control server 250, hosted model versioning system (MVS) repository(s) 260, an image processing deep learning (DL) model construction system 205, and/or a parameter archival storage (PAS) system 280, in operative communication with each other.

In some embodiments, the term "module" as used herein may refer to a functional assembly (e.g., packaged functional assembly) of one or more associated electronic components and/or one or more associated technology applications, programs, and/or codes. Moreover, in some instances, a "module" together with the constituent electronic components and/or associated technology applications/programs/codes may be independently operable and/or may form at least a part of the system architecture. In some embodiments, the term "module" as used herein may refer to at least a section of a one or more associated technology applications, programs, and/or codes and/or one or more associated electronic components. It is also noted that machine learning and deep learning are interchangeably utilized throughout this description.

The image processing technology platform module 200 typically comprises the image processing DL Regulator system 210, which is typically configured for transformation and processing of neural-network based machine learning models. In this regard, the image processing DL Regulator system 210 comprises a model versioning system (MVS) module 212, an image processing DL model query command application 214, and an image processing DL model analysis and processing system module 216. Specifically, in some embodiments, the image processing DL Regulator system 210 is a global centralized system for constructing model abstraction layers over neural networks via the image processing DL model query command application 214 (also referred to as an electronic query engine 214) which are configured for (i) versioning neural-network based machine learning models (also referred to as neural-network machine learning image processing models) via the MVS module 212, (ii) selection, mutation and construction of the neural-network based machine learning models via the deep learning query language parser and optimizer 215, and (iii) processing/analysis, tracking characteristics (e.g., hyper parameters), inventory of the number of models, their performance and statistics of the neural-network based machine learning models via the image processing DL model analysis and processing system module 216. These model abstraction layers are constructed such that neural-network based machine learning models can be selected, mutated and constructed, via user input queries comprising a plurality of discrete input language elements in the form of natural language character strings, which are transformed into actionable, neural-network compatible, machine-executable instructions by the deep learning query language parser and optimizer 215.

The model versioning system (MVS) module 212, via its command line and user interface (UI) tool components 213, in general, is structured for versioning machine-learning neural-network based image processing models, thereby allowing a user to mutate existing machine-learning neural-network based models for new/different/additional applications/purposes using mere discrete input language elements typically in the form of natural language, without requiring time consuming and computationally expensive construction of new models. Moreover, embodiments of the invention are also configured for identifying and tracking mutations in hyper parameters amongst versions of image processing models. The command line and UI tool components 213 are also structured for uploading a constructed model from a local model versioning system (MVS) repository 230 (e.g., that is associated with the user device 104 of a particular user) to the image processing model control server 250 (e.g., a global system associated with numerous users) and perform the necessary transformations, as well as extracting a model from the hosted repositories 260 via the image processing model control server 250 onto the image processing DL model regulator system 210 for processing and/or onto the local MVS repository 230.

Specifically, the MVS module 212 is structured for check-in and check-out of versioning machine-learning neural-network based image processing models (e.g., those stored in the hosted MVS repository(s) 260, or in the local MVS repository 230), determine and track mutations and versions of the image processing models, highlight the mutations and variations in hyper parameters, and also highlight whether a single model has been operated upon by several users and track individual user actions thereon. The MVS module 212, via the DL model version management enumeration and model publishing application 252 is also structured for versioning, processing and uploading models constructed by the user at the local MVS repository 230 onto the hosted MVS repositories 260 via the image processing model control server 250. In some embodiments, the MVS module 212 may perform one or more of these steps in response to receiving user queries containing a plurality of discrete elements (e.g., similar to the queries (510, 520) illustrated in FIG. 5) each containing natural language strings. Here, the user queries comprise operational discrete elements (512a, 522a) of a model version management type. In some embodiments, such operational discrete elements (512a, 522a) may comprise commands such as "init" for initializing a model at the MVS repository 260, "add" for adding the image processing model to be committed into the MVS repository 260, "commit" for commuting the added image processing model, "copy" for scaffolding a new model from an existing model in the repository, "archive" for archiving models in the MVS repository 260, etc.

The image processing DL model query command application 214 (also referred to as the electronic query engine 214), via its deep learning query language parser and optimizer 215, in general, is structured for providing a model abstraction layer over the neural network based image processing models. This model abstraction layer provides an user interface through which the user can initiate interrogation, selection, mutation and construction of the image processing models, using mere discrete input language elements typically in the form of natural language, and without requiring the user to interpret each and every element/component/function of the myriad hidden layers and other components at the hosted MVS repository(s) 260. Here, the user queries may be similar to the queries (510, 520) illustrated in FIG. 5, containing a plurality of discrete elements. Indeed, this natural language compatible abstraction layer extends throughout the image processing technology platform module 200, and is structured to be compatible with the module 200's functions described herein. Specifically, the deep learning query language parser and optimizer 215 is configured for receiving and parsing user queries in the form of discrete input language elements each comprising natural language strings, optimize the user queries, transform the discrete input language elements into neural-network compatible instructions, and feed instructions to transform/mutate the image processing models accordingly to the respective system/module. Here, the image processing DL model query command application 214 may be invoked by the MVS module 212, the image processing model control server 250, etc., for converting received user queries in the form of discrete input language elements each comprising natural language strings.

The image processing DL model analysis and processing system module 216, via its deep learning model wrapper 217, is structured for tracking characteristics of the image processing models (e.g., hyper parameters), inventory of the number of models, their performance and statistics, etc. Moreover, the deep learning model wrapper 217 is structured for interrogation of the image processing model, typically, in response to user queries related to model exploration. Here, the user queries may be similar to the queries (510, 520) illustrated in FIG. 5, containing a plurality of discrete elements, with the operational discrete elements (512a, 522a) being of the model analysis type. In some embodiments, such operational discrete elements (512a, 522a) may comprise commands such as "list" for listing models and related lineages, "desc" for describing a particular/selected model, "diff" for comparing multiple models, "eval" for evaluating the model with given input test data, etc.

Now referring to the local MVS repository 230, the local MVS repository 230 is typically a local storage associated with the user device 104. In some embodiments, the image processing model data comprises metadata, model artifacts, and hyper parameters. The metadata of the image processing models constructed or trained by the user may be stored at the image processing DL model metadata 232, while the model artifacts may be stored at the git repository 234 with a suitable folder structure. The hyper parameters of the image processing model may be stored in a compressed form at the parameter archival storage 240 via the parameter archival storage (PAS) system 280, as will be described later on. As such, during the creation or training of the image processing model, the files corresponding to the metadata, model artifacts, and hyper parameters may be stored (e.g., temporarily) at the local MVS repository 230. When the user wishes the image processing model to be globally available, the user may check-in the model to the hosted MVS repositories 260. Here, the user may input user queries containing a plurality of discrete elements (e.g., similar to the queries (510, 520) illustrated in FIG. 5) each containing natural language strings. These user queries comprise operational discrete elements (512a, 522a) of a model version management type described above. In some embodiments, such operational discrete elements (512a, 522a) may comprise commands such as "init" for initializing a model at the MVS repository 260, "add" for adding the image processing model to be committed into the MVS repository 260, "commit" for commuting the added image processing model, "copy" for scaffolding a new model from an existing model in the repository, "archive" for archiving models in the MVS repository 260, etc. Based on receiving these queries from the user device 104, the MVS module 212 may transmit the model files to be stored to the image processing model control server 250, which may then store the files at the repository 260 and make the model globally available via the image processing DL model publishing component 256.

Moreover, the user may seek to check-out an existing model in the hosted MVS repository(s) 260, e.g., for the purposes of analyzing, viewing, comparing or mutating the model. Here, the user may input user queries containing a plurality of discrete elements (e.g., similar to the queries (510, 520) illustrated in FIG. 5) each containing natural language strings. These user queries comprise operational discrete elements (512a, 522a) of a remote interaction type comprising commands such as "publish" for publishing a model (e.g., a mutated model) to the system 210, "search" for searching/selecting models in the MVS repository 260, "pull" for downloading model files, etc. Based on receiving these queries from the user device 104, the MVS module 212 may transmit instructions to the image processing model control server 250 to retrieve the files via the image processing DL model search component 254, and subsequently deliver the model files (e.g., after reconstructing the model) to the user device 104.

The image processing deep learning (DL) model construction system 205 is structured for construction and mutation of image processing models.

The parameter archival storage (PAS) system 280 is structured for read-optimized compression storage of machine-learning neural-network based image processing models with reduced storage. Here, the parameter archival storage system is configured for determining and using deltas (e.g., mutated/altered weights filters) in the structure of neural network based machine-learning models. This novel storing system is configured for reducing/compressing the storage requirements for a neural network based machine-learning model from storing complex architecture involving numerous interconnected layers, components and functions, to storing mere floating point bits, providing data compression in the range of 100,000:1, 10,000:1, 1000:1, etc., without losing any accuracy of the model. The functions of the PAS system 280 will be described in greater detail with respect to FIG. 8 later on.

An illustrative example of the functioning of the image processing technology platform module 200, in accordance with some embodiments, will be described now. A neural network based deep/machine learning model (e.g., such as image processing model 301 of FIG. 3 having 2 convolution and pooling layers, 2 Relu Activation functions and initial weights) may be constructed at the local MVS repository 230, e.g., via the image processing DL model construction system 205. In some instances, this model, prior to compression by the PAS system 280 comprises the model hierarchical architecture which may be stored at the local repository 230 with the name such as "imagearch" and also all of the weigh parameter objects which may be stored at the local repository 230 with the name such as "imagepas". The system may then initiate training of the model by providing training images to the model. Here, the system typically constructs metadata for the model and stores it at image processing DL model metadata 232, and constructs parameterized storage via the PAS system 280 (e.g., highly compressed storage of the model having altered weigh parameter objects and hyperparameters during training, as described by FIG. 8) and stores it at parameter archival storage 240, and constructs model artifacts and stores it in a predetermined folder structure in the Git Repository 234. After compression via the PAS system 280, the system may construct truncated compressed storage components of the models by separately storing altered weight filter bits (e.g., altered weigh parameter objects after training of the model or mutation of an existing model) weigh parameter objects with a name such as "imagepas2" and altered hyperparameters with a name such as "imagearch2" at the parameter archival storage 240 (e.g., after discarding the rest of the components).

Next, the system may initiate transmission of the model into the centralized hosted MVS repositories 260. The system typically performs this in response to receiving a user input query comprising a plurality of discrete input language elements having the operational discrete element of "init", such as:

"init imagenew" or
"init imagenew at REPOS_260"

In response to processing this user input via the DL model query command application 214, the system transforms the natural language into machine instructions and invokes an "init" function (e.g., stored in the computer readable instructions 154) and constructs a repository with the name "imagenew" in the centralized hosted MVS repositories 260.

The system may then receive user input queries comprising a plurality of discrete input language elements having the operational discrete element of "add", such as:

"add imagepas2" or "add imagepas2 to imagenew" and
"add imagearch2" or "add imagearch2 to imagenew"

In response to processing these user inputs via the DL model query command application 214, the system invokes an "add" function (e.g., stored in the computer readable instructions 154) and transmits the models files (e.g., of the image processing model 301) to the hosted MVS repositories 260, via the server 250. The user may then commit the files of the model in the hosted MVS repositories 260 via a query having an operational discrete element of "commit", whereupon the system may make the model available globally, and which may be access through user inputs DL regulator system 210. Here, the user may also publish the model to DL regulator system 210 using a query having an operational discrete element of "publish." The pre-compression files and architecture stored at the local MVS repository 230 may then be discarded/deleted.

Now, if the user (or another user) seeks to view, operate, train or mutate a particular model out of one or more image processing models stored in the hosted MVS repositories 260, the user may input a query having an operational discrete element of "list." In response to processing this user input via the DL model query command application 214, the system may display a list of the one or more models stored at the hosted MVS repositories 260 on the user interface of the user device. The user may also search for a particular model using a query having an operational discrete element of "search."

In the user seeks to determine attributes of a particular model (e.g., model 301 stored as "imagenew"), the user may input a query having an operational discrete element of "desc," such as "desc imagenew." In response to processing this user input via the DL model query command application 214, the system may display attributes of the model on the user interface of the user device such as descriptions, comprehensive characteristics, type of neural network being used, stages, etc.

If the user seeks to evaluate the accuracy of the model, the user may input a query having an operational discrete element of "eval." For instance, the user may input a query such as "eval imagenew for testcase1." In response to processing this user input via the DL model query command application 214, the system may extract "testcase1" files from the respective storage location and utilize them to perform accuracy testing of the model (e.g., after reconstructing the model from the compressed storage), and display the results and progress.

If the user seeks to replicate the model, the user may input a query having an operational discrete element of "copy." In response to processing this user input via the DL model query command application 214, the system may scaffold a new model accordingly. The user may then proceed to mutate this new model. If the user seeks to compare the model with another, the user may input a query having an operational discrete element of "diff." In response to processing this user input via the DL model query command application 214, the system may initiate comparison and tracking of the changes.

If the user seeks to download the model for remote interaction, the user may input a query having an operational discrete element of "pull."

FIG. 3 illustrates a schematic representation 300 of an image processing model 301, in accordance with one embodiment of the present invention. The image processing model may receive an image input 312 via image input batch 310. As illustrated, the image processing model 301 may comprise a plurality of hidden layers 320. These hidden layers 320 typically comprise alternating non-linear activation layers (322, 332) (e.g., convolution neural network layers) and pooling neural network layers (328, 338). Moreover, the each of the non-linear activation layers (322, 332) may further comprise a convolution component (324, 334) and an activation function (326, 336), such as a rectified linear unit (ReLU), as illustrated. Based on processing the image input 312, the image processing model 301 may construct classification layers 320, such as flatten 362, fully connected layer 364, and Softmax 366.

FIG. 4 depicts an illustrative representation 400 of a structure 401 of the image processing model 301, in accordance with one embodiment of the present invention. Specifically, FIG. 4 illustrates a schematic representation of the storage of data elements associated with the hierarchical architecture 401 of the image processing model 301 of FIG. 3. Specifically, the storage structure of the model may comprise a hierarchical linked architecture comprising a plurality of data structures 402-490. The data structures may comprise a pixel coordinates associated with the image input 312 and the corresponding weights in the form of floating point decimals.

The functioning of the image processing model 301 will now be described in conjunction with FIGS. 3 and 4. Here, the system may seek to construct and train the model 301 to identify vehicles in an image. The system may utilize a batch of images 312 having depictions of various vehicles and other non-vehicular depictions for the purposes of training and testing the model 301. Each image 312 is a matrix/collection of pixels arranged in rows and columns. Each pixel is associated with (i) pixel coordinates (location coordinates in the form of row number and column number) and (ii) color value weights (red, blue, green values, i.e., RBG values). In other words, a pixel having a particular coordinate (n (row), m (col)) comprises an associated RBG color value.

Certain systems may employ linear models for analyzing the image. However, in the image 312 there is no linear correlation between the pixel coordinate and the object required to the identified/recognize. In other words, there is no correlation that with an increase in x axis there would be more objects (e.g., vehicles), or that with a decrease in Y axis we would have less objects (e.g., pedestrians). The objects can appear anywhere in the image depending on the image frame, thereby exhibiting a non-linear relationship with the rows and columns of the pixels in the image.

The linear output of pixel coordinates' rows and columns need to be converted to non-linear outputs associated with location of the object being identified. To overcome this, the system may construct a plurality of non-linear activation layers (322, 332) having convolution components (324, 334) and activation functions (326, 336), such as a rectified linear unit (RELU). The activation functions (326, 336) typically are non-linear activation functions comprising Sigmoid, TanH, ArcTan, ArSinH, ElliotSig, Softsign, Inverse square root unit (ISRU), Inverse square root linear unit (ISRLU), Square Nonlinearity (SQNL), Rectified linear unit (ReLU), Bipolar rectified linear unit (BReLU), Leaky rectified linear unit (Leaky ReLU), Parameteric rectified linear unit (PReLU), Randomized leaky rectified linear unit (RReLU), Exponential linear unit (ELU), Scaled exponential linear unit (SELU), S-shaped rectified linear activation unit (SReLU), Adaptive piecewise linear (APL), SoftPlus, Bent identity, Sigmoid Linear Unit (SiLU), SoftExponential, SoftExponential, Soft Clipping, Soft Clipping, Gaussian activation function, and/or the like.

At the first non-linear activation layer 322, the convolution component 324 analyzes the image to identify major/key features, i.e., primary/principal/fundamental features/objects of the image. The system may initialize the image by assigning floating point decimal weights to the each of the pixel coordinates for locating major/key features, i.e., primary/principal/fundamental features/objects of the image. E.g., the weights may be assigned such that higher weights or weights in a particular range may indicate presence of a primary feature/object (e.g., an object to be identified, a collection or objects to be identified, other objects, etc.) at the corresponding pixel coordinate, thereby forming data structures 402-406. Although three data structures 402-406 are illustrated in FIG. 4 for ease of depiction, it is understood that each of the hundreds or thousands of pixels in the image 312 is assigned a floating point decimal weight, thereby forming a floating point array of hundreds or thousands of data structures. The activation function 326 such as a ReLU function 420 then processes the image in conjunction with the data structures 402-406 to identify the pixels associates with key features to be identified and extracts the associated data structures 432. Again, it is noted that although a single data structure 432 is illustrated for ease of depiction, there may be numerous such data structures associated with key features.

Next, the system constructs a pooling layer 328 that is structured to eliminate/remove rotational variants in the image (e.g., for the purposes of identifying a vehicle, even if the vehicle is depicted as tilted or up-side down or as a reflection in the image, instead of being depicted straight upright with wheels on the ground). Here the system may employ a hyperbolic functions such as TanH. It is noted that, as these hidden layers 320 are successively built, a corresponding complex hierarchical geometrical data structure architecture associated with the model is created and stored as depicted by FIG. 4.

Similar to the first non-linear activation layer 322 and the first pooling layer 328, the system may construct a second non-linear activation layer 332 (having a convolution layer component 324 and an activation fiction 336 of Function 460) and a second pooling layer 338, and the corresponding geometric hierarchy levels of the data structures 452-456 and 460 are appended (i.e., constructed and linked) to those of the first non-linear activation layer 322 and the first pooling layer 328 as illustrated in FIG. 4. Many additional non-linear activation layers and pooling layers may successively constructed, and their corresponding geometric hierarchy levels of the data structures are constructed and appended to the stored architecture 401.

Next, the system constructs classification layers 360. The system may first construct a flatten layer 362. Here, the system converts the multi-dimensional array of key features received from the preceding pooling layer into a single column array having all of the corresponding floating point weights. This is then fed into a constructed fully connected (FC) layer 364 having numerous neurons. Each of the neurons comprises a weight. In the fully connected layer 364, each of the neuron weighs is multiplied with the corresponding floating point weights, thereby forming data structures 472 and 474. The system may then construct a classification program/algorithm component 366 such as Softmax or Softmax cross entropy 480. The classification program/algorithm component 366 is structured to analyzed the products of the multiplication in the fully connected layer 364 to categorized the identified features into various categories of vehicles (e.g., C1—bicycle, C2—car, C3—Truck, C4—bus, etc.), and construct a corresponding data structure 490 indicating the final identified categorized object—e.g., a car.

In this way, as depicted by FIGS. 3-4, the model 301 in the form of a complex hierarchical geometrical data structure architecture 401 is constructed and stored having (i) hierarchical sequential arrangement framework of the layer components and (ii) corresponding weight components (in the form of kernels of ((Pixel Coordinates), Floating Point Weights) such as 402-4706, 432, . . . and corresponding operative functions such as 420, 440, 460, 480, . . . ). It is noted that storing this complex, multilayered architecture and corresponding hundreds/thousands of data structures for each and every model of the myriad of models in the repository 260, requires immense memory and processing power. To address this problem, the present invention provides a parameter archival storage system for compressions storage of the model as will be described with respect to FIG. 8, later on.

Moreover, the system may then compare the identified categorized object with the ground truth to determine if the identification by the model was accurate. If the identification was not accurate, the system then modify the assigned weights, mutate the activation functions, etc. untill the desired accuracy is achieved.

FIG. 5, illustrates an illustrative representation 500 of user input queries comprising a plurality of discrete input language elements, in accordance with one embodiment of the present invention. As described with respect to FIG. 2, the user may input user queries (510, 520) containing a plurality of discrete elements (512a-512e, 522a-522f) each containing natural language strings. Here, the user queries comprise operational discrete elements (512a, 522a) of a model version management type such as "init" for initializing a model at the MVS repository 260, "add" for adding the image processing model to be committed into the MVS repository 260, "commit" for commuting the added image processing model, "copy" for scaffolding a new model from an existing model in the repository, "archive" for archiving models in the MVS repository 260, etc. The operational discrete elements (512a, 522a) may also be of a model analysis type, such as "list" for listing models and related lineages, "desc" for describing a particular/selected model, "diff" for comparing multiple models, "eval" for evaluating the model with given input test data, etc. The operational discrete elements (512a, 522a) may also be of a remote interaction type comprising commands such as "publish" for publishing a model (e.g., a mutated model) to the system 210, "search" for searching/selecting models in the MVS repository 260, "pull" for downloading model files, etc.

As a non limiting example of the user query 510, the user query may take the form of:

"select m1 from PAS_REPOS where m1.activation=='return'"

Here, the operational discrete element 512a indicating the action to be performed is "select," the identifier discrete element 512c indicating the location/name of the model/program comprises "m1", the operator discrete element 512b indicating the preposition type relational context is "from", a keyword discrete element 512d indicating the source location is a parametrized storage location of "PAS_REPOS", while the conditional discrete element 512e indicating the condition for performing the task associated with the operational discrete element 512a is "where m1.activation=='relu'". In other words, the query is associated with searching the PAS_REPOS location of the hosted MVS repositories 260 to select a model with the name m1 which comprises a ReLU type activation function.

As yet another non limiting example of the user query 510, the user query may take the form of:

"select m1 where m1.name like "densenet_%" and m1.creation_time>"2019-01-01" and m1["conv[1, 3, 5]"].next POOL("Average")"

Here, the operational discrete element 512a indicating the action to be performed is "select," the identifier discrete element 512c indicating the location/name of the model/program comprises "m1", while a first conditional discrete element 512e indicating the requirement for performing the task associated with the operational discrete element 512a is "where m1.name like "densenet %"", a second conditional discrete element specifying time of creations of "m1.creation_time>"2019-01-01," and a third conditional discrete element specifying the type of convolution layer required of "m1["conv[1, 3, 5]"].next POOL("Average")". In other words, the query is associated with searching the MVS repositories 260 to select a model m1 which is constructed using densenet type image network, which was created after 2019-01-01, and which has a convolution layer with a single channel, a resolution of 3×5 and which has average pooling.

The system may receive or construct such queries, and after processing them via the DL Regulator system 210, extract the model(s) that corresponds to the query.

As a non limiting example of the user query 520, the user query may take the form of:

"construct m2 from m1 where m1.activation='relu' mutate m1["relu*($1)"].=tanh("relu$1")"

Here, the operational discrete element 522a indicating the action to be performed is "construct," the identifier discrete element 522c indicating the location/name of the new model/program comprises "m2", the operator discrete element 522b indicating the preposition type relational context is "from", a keyword discrete element 522d indicating the existing model is "m1", while the conditional discrete element 522e indicating the condition for performing the task associated with the operational discrete element 522a is "where m1.activation='relu'", and the mutation discrete element 522f indicating the mutation to be performed is "mutate m1["relu*($1)"].=tanh("relu$1")". In other words, based on processing this query the system extracts a model m1 having a ReLU type activation function, and constructs a new model m2 by mutating (e.g., by overwriting, replacing, transforming, etc.) the model m1, by mutating the ReLU type activation function to a Tanh type.

As another non limiting example of the user query 520, the user query may take the form of:

"construct m2 from m1 where m1.m=name like "alexnet–avgv1%," and m1["conv*($1)"].next has POOL("AVG") mutate m1["conv*($1)"].insert=RELU("relu$1")"

Here, the operational discrete element 522a indicating the action to be performed is "construct," the identifier discrete element 522c indicating the location/name of the new model/program comprises "m2", the operator discrete element 522b indicating the preposition type relational context is "from", a keyword discrete element 522d indicating the existing model is "m1", while a first conditional discrete element 522e indicating the condition for performing the task associated with the operational discrete element 522a is "where m1.m=name like "alexnet–avgv1%", a second conditional discrete element indicating "m1["conv*($1)"].next has POOL("AVG")" and the mutation discrete element 522f indicating the mutation to be performed is "mutate m1["conv*($1)"].insert=RELU("relu$1")". In other words, based on processing this query the system extracts a model m1 constructed in alexnet type image network and having a convolution layer with average pooling, and constructs a new model m2 by mutating the model m1, by inserting a ReLU type activation function at a particular convolution layer conv*($1).

FIG. 6, illustrates a high level process flow 600 for an electronic query engine (also referred to as an image processing DL model query command application 214) for an image processing model database, in accordance with one embodiment of the present invention. Here, the system is configured for constructing a model abstraction layer for machine-learning neural-network based image processing models configured for selection, mutation and construction of the image processing models. As discussed previously, existing neural-network based machine-learning models, by their inherent structure itself (e.g., hidden layers, non-linear nature, constant changes due to learning based on inputs provided, etc.), consist of a "black box" type structure that necessarily obscures the neural network and makes interpretability of the neural network challenging. For instance, it is extremely arduous and unfeasible, if not impossible, for a user or even another system to ascertain why or how the neural-network arrived at a certain output, what the components (e.g., hyper parameters) of the neural network are, or what components caused a particular output (e.g., a defective output). Moreover, with conventional neural-network based machine-learning technology, it is not possible to search the hierarchical linked architectures for neural network based image processing models stored in a repository, to identify models with certain parameters. Construction, training, and optimization of conventional neural network based machine-learning models, by their very nature, are extremely time consuming and computationally expensive, and also require large amounts of data for training and optimization purposes. Reducing the time spent in training and optimization and reducing the training data provided would result in inaccurate models. Typically, conventional neural-network based machine-learning technology does not allow leveraging existing models to alleviate the foregoing time and data requirements. The electronic query engine of the present invention provides a model abstraction layer over the neural network based image processing models. This model abstraction layer is structured for interrogation, selection, mutation and construction of the image processing models with reduced memory, time and processing requirement, using mere discrete input language elements typically in the form of natural language, and without requiring the user to interpret each and every element/component/function of the myriad hidden layers and other components. Moreover, the electronic query engine is also configured for image processing tasks such as segmentation and object detection, by generalizing model exploration and enumeration queries from commonly conducted tasks by machine/deep learning modelers. In the embodiments described herein, the electronic query engine is also structured for mutating exiting models to construct new models.

First, at block 602, the system may receive, from a user device, a first user input query comprising a first plurality of discrete input language elements. As discussed previously, each of the first plurality of discrete input language elements comprises a character string, as described with respect to FIGS. 2 and 5. Each of the character strings are typically in natural speech/language.

In response, the system may parse the first user input query to identify at least (i) a first operational type discrete element of the first plurality of discrete input language elements, and (ii) a first conditional type discrete element of the first plurality of discrete input language elements, as depicted by block 604. As discussed previously, the system may identify a model version management type operational discrete element such as "init" for initializing a model at the MVS repository 260, "add" for adding the image processing model to be committed into the MVS repository 260, "commit" for commuting the added image processing model, "copy" for scaffolding a new model from an existing model in the repository, "archive" for archiving models in the MVS repository 260, etc. The system may identify a model analysis type operational discrete element, such as "list" for listing models and related lineages, "desc" for describing a particular/selected model, "diff" for comparing multiple models, "eval" for evaluating the model with given input test data, etc. The system may identify operational discrete elements of a remote interaction type comprising commands such as "publish" for publishing a model (e.g., a mutated model) to the system 210, "search" for searching/selecting models in the MVS repository 260, "pull" for downloading model files, etc. The system may further identify conditional type discrete elements which describe the requirements for performing the actions of the operational discrete elements, such as "when . . . ", "if . . . ", "where . . . " etc., as described with respect to FIG. 5.

Next, the system may determine that the first operational-type discrete element is associated with construction of a new second image processing model by transforming a first image processing model from the at least one hosted model versioning system repository. As non limiting examples of the user input query, the user query may take the form of "construct m2 from m1 where m1.activation=='relu' mutate m1["relu*($1)"].=tanh("relu$1")" or "construct m2 from m1 where m1.m=name like "alexnet–avgv1%" and m1["conv*($1)"].next has POOL("AVG") mutate m1["conv*($1)"].insert=RELU("relu$1")", etc. Here, the system may determine that the first operational-type discrete element "construct" is associated with construction of a new second image processing model ("m2") by transforming/mutating a first image processing model ("m1") from the at least one hosted model versioning system repository.

Subsequently, the system may extract the first image processing model of the one or more image processing models based on determining that at least one of a plurality of first convolutional neural network layers of the first image processing model is associated with at least the first conditional type discrete element, as illustrated by block 606. As an example, for the user input query of "construct m2 from m1 where m1.activation=='relu' mutate m1["relu*($1)"].=tanh("relu$1")", the system may extract the first image processing model "m1" of the one or more image processing models based on determining that at least one of a plurality of first convolutional neural network layers of the first image processing model "m1" is associated with at least the first conditional type discrete element of "activation=='relu'". In other words, the system may extract the first image processing model "m1" of the one or more image processing models based on determining that at least one of a plurality of first convolutional neural network layers of the first image processing model "m1" is associated with ReLU type activation function. As another example of the user input query of "construct m2 from m1 where m1.activation=='relu' mutate m1["relu*($1)"].=tanh ("relu$1")" or "construct m2 from m1 where m1.m=name like "alexnet–avgv1%" and m1["conv*($1)"].next has POOL("AVG") mutate m1["conv*($1)"].insert=RELU ("relu$1")", the system may extract the first image processing model "m1" of the one or more image processing models based on determining that at least one of a plurality of first convolutional neural network layers of the first image processing model "m1" is associated with ReLU type activation function. In some embodiments, extracting the first image processing model further comprises reconstructing the model from compressed parameterized storage as described previously and below. In some embodiments, the first image processing model may comprise a structure similar to the image processing model 301.

Next, at block 608, the system may identify a first mutation type discrete element of the first plurality of discrete input language elements in the first user input query. As non limiting examples of the user input query, the user query may take the form of "construct m2 from m1 where m1.activation=='relu' mutate m1["relu*($1)"].=tanh ("relu$1")" or "construct m2 from m1 where m1.m=name like "alexnet–avgv1%" and m1["conv*($1)"].next has POOL("AVG") mutate m1["conv*($1)"].insert=RELU ("relu$1")", etc. Here, the system may determine that the first mutation type discrete element "mutate . . . " is associated with mutation/transformation of a new second image processing model ("m2") by transforming/mutating a first image processing model ("m1").

The system may then construct the second image processing model by mutating the first image processing model at block 610. Here, the system may first construct a first mutant neural network layer component associated with the first mutation type discrete element. Next, the system may construct the second image processing model by embedding the first mutant neural network layer component at an original convolutional neural network layer of the plurality of first convolutional neural network layers of the first image processing model.

In some embodiments, the system constructs the first mutant neural network layer component by altering an original activation function. Here, the system may determine that the first mutation type discrete element is associated with altering a first activation function component of the first image processing model. Next, the system constructs the new activation function component comprising a rectified linear unit function, a TanH function, a Softmax function, a Maxout function, an inverse square function, or any of the activation functions described herein. The system may then remove the first activation function component from the original convolutional neural network layer of the first image processing model, and insert the constructed new activation function component at the original convolutional neural network layer of the first image processing model.

As an example, for the user input query of "construct m2 from m1 where m1.activation='relu' mutate m1["relu*($1)"].=tanh("relu$1")", the system may first construct a first mutant neural network layer component having a tanH function. Next, the system may construct the second image processing model by embedding the first mutant neural network layer component having a tanH function at an original convolutional neural network layer having a ReLU activation function, thereby replacing the convolutional neural network layer having a ReLU activation function with the mutant neural network layer component having a tanH function. Here, the system further construct the linkages in the model hierarchical architecture framework (similar to the architecture framework of FIG. 4) between the mutant neural network layer and the other layers.

In some embodiments, the system constructs the first mutant neural network layer component by constructing a new activation function. Here the system may determine that the first mutation type discrete element is associated with a new activation function component. Next, the system constructs the new activation function component comprising a rectified linear unit function, a TanH function, a Softmax function, a Maxout function, an inverse square function, or any of the activation functions described herein. The system may then insert the constructed new activation function component at the original convolutional neural network layer of the first image processing model.

As another example, for the user input query of "construct m2 from m1 where m1.m=name like "alexnet–avgv1%" and m1["conv*($1)"].next has POOL("AVG") mutate m1["conv*($1)"].insert=RELU("relu$1")", the system may first construct a first mutant neural network layer component having ReLU function. Next, the system may construct the second image processing model by embedding the first mutant neural network layer component having the ReLU function at an original convolutional neural network layer of the first model, thereby inserting the convolutional neural network layer having a ReLU activation function at location (before a particular layer, after a particular layer, and/or in-between two layers) described by the query. Here, the system further construct the linkages in the model hierarchical architecture framework (similar to the architecture framework of FIG. 4) between the mutant neural network layer and the other layers.

In some embodiments, the second image processing model comprises a plurality of second convolution neural network layers, similar to the model 301 described previously. These layers may comprise a plurality of convolution neural network layers, a plurality of pooling neural network layers, arranged to alternate between the plurality of convolution neural network layers, and a plurality of activation functions (e.g., at least one rectified linear unit (ReLU) type activation function), similar to those described with respect to FIGS. 3-4. Indeed, at least one of the layers of the constructed image processing model is the embedded mutant neural network layer described above.

As such, for constructing the second image processing model by embedding the first mutant neural network layer component at an original convolutional neural network layer of the plurality of first convolutional neural network layers of the first image processing model, the system may further construct a hierarchical linked architecture for the second image processing model. As discussed previously, the hierarchical linked architecture for the second image processing model comprises a sequential linked arrangement of a plurality of second convolution neural network layers associated with the second image processing model, as illustrated by FIG. 4. Moreover, the system may further construct the weigh parameter objects (i.e., floating point weights as described with respect to FIG. 4) associated with the plurality of second convolution neural network layers of the second image processing model. Typically, the weigh parameter objects are constructed such that the second image processing model can be reconstructed from the weigh parameter objects.

Finally, at block 612, the system may present a graphical representation comprising the second image processing model on a display device of the user device. Here, the system may present a representation similar to that of FIG. 3 and/or a representation similar to that of FIG. 4.

The unique compressed parameter archival storage (also referred to as parametrized storage) of the second image processing model will now be described. The system may first map the first mutant neural network layer component with the original convolutional neural network layer of the first image processing model. Here, the system may first construct and store the first mutant neural network layer component at a repository memory location. The system may then link the first mutant neural network layer component with the first image processing model at the original convolutional neural network layer location. The system may then discard the hierarchical linked architecture of the second image processing model. Hence, the second image processing model can be stored in a compressed parameterized manner by merely storing (i) the weigh parameter objects (floating point weights), and (ii) first mutant neural network layer component, at the hosted MVS repositories 260.

Specifically, the second image processing model can be stored in a compressed parameterized manner by merely storing the (i) only the weigh parameter objects (floating point weights) of the second image processing model that differ from that of the first image processing model, and (ii)

first mutant neural network layer component that is linked/mapped to the first image processing model, instead of the entire hierarchical linked architecture framework of the second image processing model. Here, the system may process/analyze a first plurality of weights associated with the plurality of first convolutional neural network layers of the first image processing model and a corresponding second plurality of weights associated with the plurality of second convolution neural network layers associated with the second image processing model. The system may then determine altered weights in the second plurality of weights that deviate from the corresponding first plurality of weights. The system may then map the altered weights in the second plurality of weights with the corresponding first plurality of weights and the corresponding plurality of first convolutional neural network layers. Indeed, here the constructed weigh parameter objects for the second image processing model are the only altered weights (the rest are discarded).

This novel storing system is configured for reducing/compressing the storage requirements for a neural network based machine-learning model from storing complex architecture involving numerous interconnected layers, components and functions, to storing mere floating point bits, providing data compression in the range of 100,000:1, 10,000:1, 1000:1, etc., without losing any accuracy of the model.

Later on, if the second image processing model is required to be reconstructed from the compressed parameterized storage, for instance, in response to receiving a second user input query comprising a second plurality of discrete input language elements (e.g., "pull m2 from PAS_REPOS" or "eval m2 from PAS_REPOS") from the user, the system may dynamically and in real time, reconstruct the model as follows. First, similar to the parsing of the user input queries described previously, the system may identify at least (i) a second operational type discrete element (e.g., "pull" or "eval") and (ii) a second conditional type discrete element (e.g., "m2 from PAS_REPOS") in the second plurality of discrete input language elements of second user input query, and determine that the second user input query is associated with selection of the constructed second image processing model for analysis. The system then extracts (i) the previously stored weigh parameter objects and (ii) the first mutant neural network layer component associated with the second image processing model. The system may then determine that the first mutant neural network layer component is linked/mapped to the first image processing model. In response, the system may extract a temporary copy of the first image processing model. The system may then dynamically reconstruct the second image processing model by mapping (i) the stored weigh parameter objects with the respective layers of the first model and (ii) the first mutant neural network layer component with an original hierarchical linked architecture of the first image processing model. The system may then present this dynamically reconstructed second image processing model on the display device of the user device.

FIG. 7, illustrates a high level process flow 700 for management of image processing model database, in accordance with one embodiment of the present invention. The system is configured for versioning machine-learning neural-network based image processing models and identifying and tracking mutations in hyper parameters amongst versions of image processing models. As discussed previously, existing neural-network based machine-learning models, by their inherent structure itself (e.g., hidden layers, non-linear nature, constant changes due to learning based on inputs provided, etc.), consist of a "black box" type structure that necessarily obscures the neural network and makes interpretability of the neural network challenging. For instance, it is extremely arduous and unfeasible, if not impossible, for a user or even another system to ascertain why or how the neural-network arrived at a certain output, what the components (e.g., hyper parameters) of the neural network are, or what components caused a particular output (e.g., a defective output). Moreover, conventional neural-network based machine-learning technology requires models to be constructed from scratch. Conventional neural-network based machine-learning technology does not allow for constructing new models by mutating existing models. Moreover, typically, neural networks themselves are not capable of identifying their own hyper parameters, because hyper parameters are provided/defined by a user during construction of the neural network. The electronic query engine of the present invention provides a model abstraction layer over the neural network based image processing models. This model abstraction layer is structured for interrogation, selection, mutation and construction of the image processing models with reduced memory, time and processing requirement, using mere discrete input language elements typically in the form of natural language, and without requiring the user to interpret each and every element/component/function of the myriad hidden layers and other components. Moreover, the electronic query engine is also configured for image processing tasks such as segmentation and object detection, by generalizing model exploration and enumeration queries from commonly conducted tasks by machine/deep learning modelers.

First at block 702 the system may receive a first user input associated with check-out of a first image processing model from the at least one hosted model versioning system repository from a user device. Here, "check-out" may refer to extracting the model (i.e., checking-out) from the MVS repository(s) 260 to the local repository 230 or the user device 104. Here, the user may seek to check-out an existing first image processing model in the hosted MVS repository(s) 260, e.g., for the purposes of mutating the model. Here, the user may input user queries containing a plurality of discrete elements (e.g., similar to the queries (510, 520) illustrated in FIG. 5) each containing natural language strings. These user queries comprise operational discrete elements (512*a*, 522*a*) for extracting the model (i.e., checking-out) from the MVS repository(s) 260 to the local repository 230/user device 104, comprising commands such as: "search" for searching/selecting models in the MVS repository 260 to locate/identify the desired first image processing model, "pull" for downloading model files, etc. Based on receiving these queries from the user device 104, the MVS module 212 may transmit instructions to the image processing model control server 250 to retrieve the files via the image processing DL model search component 254, and subsequently deliver the model files (e.g., after dynamically reconstructing the model) to the user device 104. The system may further determine that the stored files of the first image processing model are compressed parameterized storage. In this instance, the system may dynamically reconstruct the first image processing model and present it on the user device's interface. In this manner, the system may extract the first image processing model of the one or more image processing models.

Here, as discussed, the first image processing model is associated with a first plurality of hyper parameters associated with: (i) a number of convolution neural network layers, i.e., a first plurality of first convolutional neural network layers, (ii) a first activation function, (iii) number of first neurons in the plurality of first convolutional neural network layers, (iv) first loss function, (v) first regularization component, (vi) first learning rate component of the first image processing model, (vii) type of optimization function, and/or other hyperparameters. The system may then extract the first image processing model of the one or more image processing models. It is noted that in machine learning, a hyperparameter is a parameter whose value is set before the learning process begins. By contrast, the values of other parameters may be derived by the model via training.

Each image processing model (also referred to as neural-network/machine learning image processing models) typically comprises an input and an output layer (e.g., softmax layer), as well as multiple hidden layers, as illustrated by FIG. 3. As described previously, the hidden layers of a convolutional neural network (CNN) typically consist of a series of convolutional layers that convolve with a multiplication or other dot product. The activation function may be a ReLU type layer, and is subsequently followed by additional convolutions such as pooling layers, fully connected layers and normalization layers, referred to as hidden layers because their inputs and outputs are masked by the activation function and final convolution. As such, in some embodiments, the number of convolution neural network layers for a model may refer to the number of hidden layers in the model. In other embodiments, the number of convolution neural network layers for a model may refer to the total number of layers in the model.

As described with respect to FIG. 3, each image processing model also typically comprises at least one activation function (e.g., activation functions (326, 336), such as a rectified linear unit (ReLU) type activation function). In some embodiments, the activation function of a node or a layer defines the output of that node given an input or set of inputs. The activation functions typically are non-linear activation functions comprising Sigmoid, TanH, ArcTan, ArSinH, ElliotSig, Softsign, Inverse square root unit (ISRU), Inverse square root linear unit (ISRLU), Square Nonlinearity (SQNL), Rectified linear unit (ReLU), Bipolar rectified linear unit (BReLU), Leaky rectified linear unit (Leaky ReLU), Parameteric rectified linear unit (PReLU), Randomized leaky rectified linear unit (RReLU), Exponential linear unit (ELU), Scaled exponential linear unit (SELU), S-shaped rectified linear activation unit (SReLU), Adaptive piecewise linear (APL), SoftPlus, Bent identity, Sigmoid Linear Unit (SiLU), SoftExponential, SoftExponential, Soft Clipping, Soft Clipping, Gaussian activation function, and/or the like.

Typically, neurons are elementary units of an image processing model. Depending on the model used they may be called a semi-linear unit, Nv neuron, binary neuron, linear threshold function, or McCulloch-Pitts (MCP) neuron. Each layer of the image processing model typically comprises a predetermined number of neurons. The artificial neuron receives one or more inputs (e.g., representing excitatory postsynaptic potentials and inhibitory postsynaptic potentials at neural dendrites) and sums them to produce an output (or activation, representing a neuron's action potential which is transmitted along its axon). Typically, each input is separately weighted, and the sum is passed through a non-linear function such as an activation function, also known as a transfer function. The activation function of a neuron is chosen to have a number of properties which either enhance or simplify the network containing the neuron. Such activation functions may include step functions, linear combination functions, sigmoid function, rectifier functions (e.g., ReLU), etc.

Moreover, each image processing model typically comprises one or more loss functions. In machine-learning image processing and classification, minimized objective functions or loss functions may represent how well the program predicts the expected outcome in comparison with the ground truth, i.e., the cost/value of inaccuracy of predictions (problems of identifying which category a particular image belongs to). These loss functions help the machine-learning program learn from incorrect/inaccurate outputs. Loss functions may be of various types such as classification loss function type, regression loss function type, etc., such as Softmax loss functions, Sigmoid loss functions etc.

Each image processing model may further comprise one or more regularization components. Regularization components are structured to remediate over-fitting by the model, which leads to a fall in accuracy. Such regularization components may comprise Akaike information criterion (AIC), Bayesian information criterion (BIC), Ridge regression, Lasso, etc. Each image processing model may further comprise one or more learning rate components. The learning rate is a hyperparameter that controls how much to change the model in response to the estimated error each time the model weights are updated. It determines to what extent newly acquired information overrides old information, i.e., indicates learning rate decay or momentum. In some embodiments, the learning rate component is a configurable hyperparameter used in the training of neural networks that has a small positive value, typically in the range between 0.0 and 1.0. In other words, the amount that the weights of the model are updated during training is referred to as the step size or the learning rate component. Each image processing model may further comprise one or more optimization functions. Optimization functions are structured to minimize (or maximize) an objective function, i.e., an Error function of the model. The optimization function may comprise a first order optimization type function (e.g., gradient descent function), a second order optimization type function (e.g., Hessian function), etc.

At block 704, the system may receive a second user input associated with addition of a second image processing model to the at least one hosted model versioning system repository. Here, the system may receive user input queries comprising a plurality of discrete input language elements having the operational discrete element of "add", such as "add model2 to imagenew".

In response, the system may determine that the second image processing model is a version of the first image processing model, as illustrated by block 706. Here, the system may determine that the second image processing model has been constructed by mutating the first image processing model and consequently infer that the second image processing model is a version of the first image processing model. Here, the system may determine that the second image processing model is a version of the first image processing model based on determining that (i) the first image processing model has been copied to or checked out to a local repository 230 and (ii) the second image processing model has been constructed by mutating the first image processing model. The system may further request a user confirmation that the second image processing model is a version of the first image processing model.

Next, the system may determine a second plurality of hyper parameters associated with the second image processing model, at block 708. The second plurality of hyper parameters of the second image processing model may be similar to those described above, and may comprise (i) a second number of convolution neural network layers, i.e., a plurality of second convolutional neural network layers, (ii) a second activation function, (iii) a second number of second neurons in the plurality of second convolutional neural network layers, (iv) second loss function, (v) second regularization component, (vi) second learning rate component of the second image processing model, (vii) type of optimization function, and/or other hyperparameters.

The system may then correlate hyperparameters of the second image processing model with the corresponding hyperparameters of the first image processing model. The system may then map the mutations in hyper parameters between the first plurality of hyper parameters of the first image processing model and the second plurality of hyper parameters associated with the second images processing model, as illustrated by block 710.

In some embodiments, for mapping the mutations in hyper parameters, the system may determine that the plurality of first convolutional neural network layers of the first image processing model is associated with a first number of convolutional neural network layers. The system may further determine that the plurality of second convolutional neural network layers of the second image processing model is associated with a second number of convolutional neural network layers. In response, the system may determine at least one mutation based on determining that the second number of convolutional neural network layers is different from the first number of convolutional neural network layers, e.g., based on identifying that one or more layers have been inserted or removed. The system may then map the convolutional neural network layer type hyperparameters of the first image processing model and the second image processing model indicating the at least one mutation.

In some embodiments, for mapping the mutations in hyper parameters, the system may determine that the first activation function of the first image processing model is associated with a first type of non-linear activation, such as ReLU type activation. The system may further determine that the second activation function of the second image processing model is associated with a second type of non-linear activation, such as Softmax type function. The system may determine at least one mutation based on determining that the first type of non-linear activation is different from the second type of non-linear activation. The system may then map convolutional neural network layer type hyperparameters of the first image processing model and the second image processing model indicating the at least one mutation.

In some embodiments, for mapping the mutations in hyper parameters, the system may determine that a particular layer of the first image processing model is associated with a first number of neurons. The system may further determine that a corresponding layer of the second image processing model is associated with a second number of neurons. In response, the system may determine at least one mutation based on determining that the second number of neurons is different from the first number of neurons. The system may then map the neuron number type hyperparameters of the first image processing model and the second image processing model indicating the at least one mutation.

In some embodiments, for mapping the mutations in hyper parameters, the system may determine that the first loss function of the first image processing model is associated with a first type. The system may further determine that the second loss function of the second image processing model is associated with a second type. The system may determine at least one mutation based on determining that the first type of loss function is different from the second type of loss function. The system may then map loss function type hyperparameters of the first image processing model and the second image processing model indicating the at least one mutation.

In some embodiments, for mapping the mutations in hyper parameters, the system may determine that the first regularization component of the first image processing model is associated with a first type. The system may further determine that the second regularization component of the second image processing model is associated with a second type. The system may determine at least one mutation based on determining that the first type of regularization component is different from the second type of regularization component. The system may then map regularization component type hyperparameters of the first image processing model and the second image processing model indicating the at least one mutation.

In some embodiments, for mapping the mutations in hyper parameters, the system may determine that the first learning rate component of the first image processing model is associated with a first type. The system may further determine that the second learning rate component of the second image processing model is associated with a second type. The system may determine at least one mutation based on determining that the first type of learning rate component is different from the second type of learning rate component. The system may then map learning rate component type hyperparameters of the first image processing model and the second image processing model indicating the at least one mutation.

In some embodiments, for mapping the mutations in hyper parameters, the system may determine that the first optimization function component of the first image processing model is associated with a first type. The system may further determine that the second optimization function component of the second image processing model is associated with a second type. The system may determine at least one mutation based on determining that the first type of optimization function component is different from the second type of optimization function component. The system may then map optimization function component type hyperparameters of the first image processing model and the second image processing model indicating the at least one mutation.

In this manner, the system may analyze all hyperparameters to identify and map mutations, e.g., in a sequential order.

The system may subsequently present, on a display device of the user device, a graphical representation comprising the mapped mutation in hyper parameters between the first plurality of hyper parameters of the first image processing model and the second plurality of hyper parameters associated with the second images processing model, as illustrated by block 712. Here, the system may present a representation similar to that of FIG. 3 and/or a representation similar to that of FIG. 4, and the mapped mutations may be overlaid over the depictions by inserting highlighting elements in a graphical representation of the second image processing model indicating the mutations between the first plurality of hyper parameters of the first image processing model and the second plurality of hyper parameters associated with the second image processing model.

Moreover, e.g., in response to receiving the second user input associated with addition of a second image processing model to the at least one hosted model versioning system repository, the system may further construct a hierarchical linked architecture for the second image processing model. As discussed previously, the hierarchical linked architecture for the second image processing model comprises a sequential linked arrangement of a plurality of second convolution neural network layers associated with the second image processing model, as illustrated by FIG. 4. Moreover, the system may further construct the weigh parameter objects associated with the plurality of second convolution neural network layers of the second image processing model. Typically, the weigh parameter objects are constructed such that the second image processing model can be reconstructed from the weigh parameter objects.

The system may then compress the second image processing model for storage using the parameter archival storage (also referred to as parametrized storage) described previously. The system may process a first plurality of weights (i.e., floating point weights as described with respect to FIG. 4) associated with the first plurality of hyper parameters of the first image processing model and a corresponding second plurality of weights (i.e., floating point weights as described with respect to FIG. 4) associated with the second plurality of hyper parameters of the second image processing model. Here, the system may then determine altered weights in the second plurality of weights that deviate from the corresponding first plurality of weights. The system may map the altered weights in the second plurality of weights with the corresponding first plurality of weights and the corresponding plurality of first convolutional neural network layers. Hence, in this manner the system may construct the weigh parameter objects for the second image processing model comprising the altered weights. Indeed, here the constructed weigh parameter objects for the second image processing model are the only altered weights (the rest are discarded).

Specifically, the second image processing model can be stored in a compressed parameterized manner by merely storing the (i) only the weigh parameter objects (floating point weights) of the second image processing model that differ from that of the first image processing model, and (ii) the mapped mutations in hyper parameters, instead of the entire hierarchical linked architecture framework of the second image processing model. In some embodiments, based on mapping the mutations in hyper parameters between the first plurality of hyper parameters of the first image processing model and the second plurality of hyper parameters associated with the second image processing model, the system may discard the hierarchical linked architecture of the second image processing model. The system may store the second image processing model at the at least one hosted model versioning system repository by storing only (i) the weigh parameter objects, and (ii) mapped mutations in hyper parameters.

In some embodiments, the system is further configured to dynamically reconstruct the compressed second image processing model, e.g., based on receiving another user input for selecting the model for analysis. Here, the system may extract (i) the weigh parameter objects, and (ii) the mapped mutations in hyper parameters of the second image processing model. The system may then map (i) the weigh parameter objects, and (ii) the mapped mutations in hyper parameters with an original hierarchical linked architecture of the first image processing model to construct the second image processing model, and subsequently present the dynamically reconstructed second image processing model on the display device of the user device.

FIG. 8, illustrates a high level process flow 800 for a parameter archival storage system for image processing models, in accordance with one embodiment of the present invention. Here, the system is configured for read-optimized compression storage of machine-learning neural-network based image processing models with reduced storage by separately storing weight filter bits. As discussed previously, neural network based machine-learning models typically have a complex architecture involving numerous interconnected layers, components and functions. Storing and managing (e.g., checking-in and checking-out, versioning, etc.) such complex neural network based machine-learning models and their artifacts is cumbersome, and requires large amounts of memory. Embodiments of the invention provide solutions to these problems. Specifically, embodiments provide a parameter archival storage system configured for read-optimized compression storage of machine-learning neural-network based image processing models with reduced storage. Here, the parameter archival storage system is configured for determining and using deltas (e.g., mutated/altered weights filters) in the structure of neural network based machine-learning models. This novel storing system is configured for reducing/compressing the storage requirements for a neural network based machine-learning model from storing complex architecture involving numerous interconnected layers, components and functions, to storing mere floating point bits, providing data compression in the range of 100,000:1, 10,000:1, 1000:1, etc., without losing any accuracy of the model.

First at block 802, the system may receive, from a user device, a first user input to check-out a first image processing model from the at least one hosted model versioning system repository. As discussed, the first image processing model comprises a plurality of first convolutional neural network layers. The system may then extract the first image processing model of the one or more image processing models. Here, "check-out" may refer to extracting the model (i.e., checking-out) from the MVS repository(s) 260 to the local repository 230 or the user device 104. Here, the user may seek to check-out an existing first image processing model in the hosted MVS repository(s) 260, e.g., for the purposes of mutating the model. Here, the user may input user queries containing a plurality of discrete elements (e.g., similar to the queries (510, 520) illustrated in FIG. 5) each containing natural language strings. These user queries comprise operational discrete elements (512a, 522a) for extracting the model (i.e., checking-out) from the MVS repository(s) 260 to the local repository 230/user device 104, comprising commands such as: "search" for searching/selecting models in the MVS repository 260 to locate/identify the desired first image processing model, "pull" for downloading model files, etc. Based on receiving these queries from the user device 104, the MVS module 212 may transmit instructions to the image processing model control server 250 to retrieve the files via the image processing DL model search component 254, and subsequently deliver the model files (e.g., after dynamically reconstructing the model) to the user device 104. In this manner, the system may extract the first image processing model of the one or more image processing models.

At block 804, the system may receive a second user input associated with a request to store a second image processing model at least one hosted model versioning system repository. Here, the system may then receive user input queries comprising a plurality of discrete input language elements having the operational discrete element of "add", such as "add model2 to imagenew".

In response, the system may determine a hierarchical linked architecture associated with the second image processing model, as illustrated by block 806. Typically, the hierarchical linked architecture comprises a sequential linked arrangement of a plurality of second convolution neural network layers associated with the second image processing model, as described with respect to FIGS. 3-4, and 7.

Next, at block 808, the system may construct weigh parameter objects associated with the plurality of second convolution neural network layers of the second image processing model. Typically, the weigh parameter objects are constructed such that the second image processing model can be reconstructed from the weigh parameter objects. Here, the system may first extract a first plurality of weights associated with the plurality of first convolutional neural network layers of the first image processing model. The system may then extract a second plurality of weights associated with the plurality of second convolution neural network layers associated with the second image processing model. The system may then determine altered weights in the second plurality of weights that deviate from the corresponding first plurality of weights. Subsequently, the system may map the altered weights in the second plurality of weights with the corresponding first plurality of weights and the corresponding plurality of first convolutional neural network layers. In this manner, the system may construct the weigh parameter objects for the second image processing model comprising the altered weights.

The system may then discard the hierarchical linked architecture of the second image processing model at block 810. In this regard, the hierarchical linked architecture of the second image processing model that may have been stored until then at a temporary or transient memory location is purged.

At block 812, the system may store the second image processing model at the at least one hosted model versioning system repository by storing only the weigh parameter objects and present, on a display device of the user device, an indication that the second image processing model has been stored. Here, the system may first map a first hyper parameter of the plurality of first convolutional neural network layers of the first image processing model with a second hyper parameter of the plurality of second convolution neural network layers associated with the second image processing model, based on determining that the second hyper parameter is a mutation of the original first hyper parameter. The system may then storing the second image processing model at the at least one hosted model versioning system repository by storing only (i) the weigh parameter objects, and (ii) the second hyper parameter.

In some embodiments, the system is further configured to construct a pointer link between the weigh parameter objects and a stored hierarchical linked architecture associated with the first image processing model, e.g., prior to discarding the hierarchical linked architecture. This pointer line may be utilized for reconstructing the model later on.

In some embodiments, the system is further configured to dynamically reconstruct the compressed second image processing model, e.g., based on receiving another user input for selecting the model for analysis. Here, the system may extract the weigh parameter objects. The system may then map the weigh parameter objects with a stored hierarchical linked architecture of the first image processing model to construct the second image processing model. The system may then subsequently present the dynamically reconstructed second image processing model on the display device of the user device.

In some embodiments, the system is configured to dynamically reconstruct the compressed second image processing model my extracting (i) the weigh parameter objects, and (ii) the mapped mutations in hyper parameters of the second image processing model. The system may then map (i) the weigh parameter objects, and (ii) the mapped mutations in hyper parameters with an original hierarchical linked architecture of the first image processing model to construct the second image processing model, and subsequently present the dynamically reconstructed second image processing model on the display device of the user device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
|---|---|---|
| 16/531,771 | ELECTRONIC QUERY ENGINE FOR AN IMAGE PROCESSING MODEL DATABASE | Concurrently herewith |
| 16/531,833 | ELECTRONIC SYSTEM FOR MANAGEMENT OF IMAGE PROCESSING MODELS | Concurrently herewith |

The invention claimed is:

1. A parameter archival storage system for image processing models, wherein the system is configured for read-optimized compression storage of machine-learning neural-network based image processing models with reduced storage by separately storing weight filter bits, the system comprising:
    at least one hosted model versioning system repository comprising one or more image processing models stored thereon, wherein each of the one or more image processing models are configured for hierarchical processing of temporal image data via at least one convolutional neural network;
    at least one memory device with computer-readable program code stored thereon;
    at least one communication device;
    at least one processing device operatively coupled to the at least one memory device and the at least one communication device, wherein executing the computer-readable code is configured to cause the at least one processing device to:
        receive, from a user device, a first user input to check-out a first image processing model from the at least one hosted model versioning system repository, wherein the first image processing model comprises a plurality of first convolutional neural network layers;
        extract the first image processing model of the one or more image processing models;
        receive, from the user device, a second user input associated with a request to store a second image processing model at the at least one hosted model versioning system repository;
        determine a hierarchical linked architecture associated with the second image processing model, wherein the hierarchical linked architecture comprises a sequential linked arrangement of a plurality of second convolution neural network layers associated with the second image processing model, wherein determining the hierarchical linked architecture comprises storing the hierarchical linked architecture of the second image processing model stored at a transient memory location;
        construct weigh parameter objects associated with the plurality of second convolution neural network layers of the second image processing model, wherein the weigh parameter objects are constructed such that the second image processing model can be reconstructed from the weigh parameter objects;
        discard the hierarchical linked architecture of the second image processing model, wherein discarding the hierarchical linked architecture comprises purging the hierarchical linked architecture of the second image processing model from the transient memory location; and
        store the second image processing model at the at least one hosted model versioning system repository in a compressed model format by storing only the weigh parameter objects, wherein the weight parameter objects comprise a size less than the discarded hierarchical linked architecture of the second image processing model; and
        present, on a display device of the user device, an indication that the second image processing model has been stored.

2. The system of claim 1, wherein constructing weigh parameter objects associated with the second image processing model further comprises:

extracting a first plurality of weights associated with the plurality of first convolutional neural network layers of the first image processing model;

extracting a second plurality of weights associated with the plurality of second convolution neural network layers associated with the second image processing model;

determining altered weights in the second plurality of weights that deviate from the corresponding first plurality of weights;

mapping the altered weights in the second plurality of weights with the corresponding first plurality of weights and the corresponding plurality of first convolutional neural network layers; and constructing the weigh parameter objects for the second image processing model comprising the altered weights.

3. The system of claim 1, wherein executing the computer-readable code is configured to further cause the at least one processing device to:

receive, from the user device, a third user input associated with selection of the constructed second image processing model for analysis;

dynamically reconstruct the second image processing model by:
extracting the weigh parameter objects; and
mapping the weigh parameter objects with a stored hierarchical linked architecture of the first image processing model to construct the second image processing model; and present the dynamically reconstructed second image processing model on the display device of the user device.

4. The system of claim 1, wherein storing the second image processing model at the at least one hosted model versioning system repository further comprises:

mapping a first hyper parameter of the plurality of first convolutional neural network layers of the first image processing model with a second hyper parameter of the plurality of second convolution neural network layers associated with the second image processing model, based on determining that the second hyper parameter is a mutation of the original first hyper parameter; and storing the second image processing model at the at least one hosted model versioning system repository by storing only (i) the weigh parameter objects, and (ii) the second hyper parameter.

5. The system of claim 4, wherein executing the computer-readable code is configured to further cause the at least one processing device to:

receive, from the user device, a third user input associated with selection of the constructed second image processing model for analysis;

dynamically reconstruct the second image processing model by:
extracting the (i) the weigh parameter objects, and (ii) the mapped mutation in hyper parameters; and
mapping the (i) the weigh parameter objects, and (ii) the mapped mutation in hyper parameters with a stored hierarchical linked architecture of the first image processing model to construct the second image processing model; and present the dynamically reconstructed second image processing model on the display device of the user device.

6. The system of claim 1, wherein storing the second image processing model at the at least one hosted model versioning system repository further comprises:

constructing a pointer link between the weigh parameter objects and a stored hierarchical linked architecture associated with the first image processing model.

7. The system of claim 1, wherein executing the computer-readable code is configured to further cause the at least one processing device to perform training of the second image processing model.

8. A computer program product for an parameter archival storage system for image processing models, wherein the computer program product is configured for read-optimized compression storage of machine-learning neural-network based image processing models with reduced storage by separately storing weight filter bits, the computer program product comprising a non-transitory computer-readable storage medium having computer-executable instructions that when executed by a processing device are configured to cause the processing device to:

receive, from a user device, a first user input to check-out a first image processing model from the at least one hosted model versioning system repository, wherein the first image processing model comprises a plurality of first convolutional neural network layers;

extract the first image processing model of the one or more image processing models;

receive, from the user device, a second user input associated with a request to store a second image processing model at the at least one hosted model versioning system repository;

determine a hierarchical linked architecture associated with the second image processing model, wherein the hierarchical linked architecture comprises a sequential linked arrangement of a plurality of second convolution neural network layers associated with the second image processing model, wherein determining the hierarchical linked architecture comprises storing the hierarchical linked architecture of the second image processing model stored at a transient memory location;

construct weigh parameter objects associated with the plurality of second convolution neural network layers of the second image processing model, wherein the weigh parameter objects are constructed such that the second image processing model can be reconstructed from the weigh parameter objects;

discard the hierarchical linked architecture of the second image processing model, wherein discarding the hierarchical linked architecture comprises purging the hierarchical linked architecture of the second image processing model from the transient memory location; and store the second image processing model at the at least one hosted model versioning system repository in a compressed model format by storing only the weigh parameter objects, wherein the weight parameter objects comprise a size less than the discarded hierarchical linked architecture of the second image processing model; and present, on a display device of the user device, an indication that the second image processing model has been stored.

9. The computer program product of claim 8, wherein constructing weigh parameter objects associated with the second image processing model further comprises:

extracting a first plurality of weights associated with the plurality of first convolutional neural network layers of the first image processing model;

extracting a second plurality of weights associated with the plurality of second convolution neural network layers associated with the second image processing model;
determining altered weights in the second plurality of weights that deviate from the corresponding first plurality of weights;
mapping the altered weights in the second plurality of weights with the corresponding first plurality of weights and the corresponding plurality of first convolutional neural network layers; and
constructing the weigh parameter objects for the second image processing model comprising the altered weights.

10. The computer program product of claim 8, wherein the non-transitory computer-readable storage medium further comprises computer-executable instructions that when executed by the processing device are configured to cause the processing device to:
receive, from the user device, a third user input associated with selection of the constructed second image processing model for analysis;
dynamically reconstruct the second image processing model by:
extracting the weigh parameter objects; and
mapping the weigh parameter objects with a stored hierarchical linked architecture of the first image processing model to construct the second image processing model; and
present the dynamically reconstructed second image processing model on the display device of the user device.

11. The computer program product of claim 8, wherein storing the second image processing model at the at least one hosted model versioning system repository further comprises:
mapping a first hyper parameter of the plurality of first convolutional neural network layers of the first image processing model with a second hyper parameter of the plurality of second convolution neural network layers associated with the second image processing model, based on determining that the second hyper parameter is a mutation of the original first hyper parameter; and
storing the second image processing model at the at least one hosted model versioning system repository by storing only (i) the weigh parameter objects, and (ii) the second hyper parameter.

12. The computer program product of claim 11, wherein the non-transitory computer-readable storage medium further comprises computer-executable instructions that when executed by the processing device are configured to cause the processing device to:
receive, from the user device, a third user input associated with selection of the constructed second image processing model for analysis;
dynamically reconstruct the second image processing model by:
extracting the (i) the weigh parameter objects, and (ii) the mapped mutation in hyper parameters; and
mapping the (i) the weigh parameter objects, and (ii) the mapped mutation in hyper parameters with a stored hierarchical linked architecture of the first image processing model to construct the second image processing model; and
present the dynamically reconstructed second image processing model on the display device of the user device.

13. The computer program product of claim 8, wherein storing the second image processing model at the at least one hosted model versioning system repository further comprises:
constructing a pointer link between the weigh parameter objects and a stored hierarchical linked architecture associated with the first image processing model.

14. The computer program product of claim 8, wherein the non-transitory computer-readable storage medium further comprises computer-executable instructions that when executed by the processing device are configured to cause the processing device to perform training of the second image processing model.

15. A computerized method for an parameter archival storage system for image processing models, wherein the computerized method is configured for read-optimized compression storage of machine-learning neural-network based image processing models with reduced storage by separately storing weight filter bits, the computerized method comprising:
receiving, from a user device, a first user input to checkout a first image processing model from at least one hosted model versioning system repository, wherein the first image processing model comprises a plurality of first convolutional neural network layers;
extracting the first image processing model of the one or more image processing models;
receiving, from the user device, a second user input associated with a request to store a second image processing model at the at least one hosted model versioning system repository;
determining a hierarchical linked architecture associated with the second image processing model, wherein the hierarchical linked architecture comprises a sequential linked arrangement of a plurality of second convolution neural network layers associated with the second image processing model, wherein determining the hierarchical linked architecture comprises storing the hierarchical linked architecture of the second image processing model stored at a transient memory location;
constructing weigh parameter objects associated with the plurality of second convolution neural network layers of the second image processing model, wherein the weigh parameter objects are constructed such that the second image processing model can be reconstructed from the weigh parameter objects;
discarding the hierarchical linked architecture of the second image processing model, wherein discarding the hierarchical linked architecture comprises purging the hierarchical linked architecture of the second image processing model from the transient memory location; and
storing the second image processing model at the at least one hosted model versioning system repository in a compressed model format by storing only the weigh parameter objects; wherein the weight parameter objects comprise a size less than the discarded hierarchical linked architecture of the second image processing model; and
presenting, on a display device of the user device, an indication that the second image processing model has been stored.

16. The computerized method of claim 15, wherein constructing weigh parameter objects associated with the second image processing model further comprises:

extracting a first plurality of weights associated with the plurality of first convolutional neural network layers of the first image processing model;

extracting a second plurality of weights associated with the plurality of second convolution neural network layers associated with the second image processing model;

determining altered weights in the second plurality of weights that deviate from the corresponding first plurality of weights;

mapping the altered weights in the second plurality of weights with the corresponding first plurality of weights and the corresponding plurality of first convolutional neural network layers; and constructing the weigh parameter objects for the second image processing model comprising the altered weights.

17. The computerized method of claim 15, wherein the method further comprises:

receiving, from the user device, a third user input associated with selection of the constructed second image processing model for analysis;

dynamically reconstructing the second image processing model by:

extracting the weigh parameter objects; and mapping the weigh parameter objects with a stored hierarchical linked architecture of the first image processing model to construct the second image processing model; and presenting the dynamically reconstructed second image processing model on the display device of the user device.

18. The computerized method of claim 15, wherein storing the second image processing model at the at least one hosted model versioning system repository further comprises:

mapping a first hyper parameter of the plurality of first convolutional neural network layers of the first image processing model with a second hyper parameter of the plurality of second convolution neural network layers associated with the second image processing model, based on determining that the second hyper parameter is a mutation of the original first hyper parameter; and storing the second image processing model at the at least one hosted model versioning system repository by storing only (i) the weigh parameter objects, and (ii) the second hyper parameter.

19. The computerized method of claim 18, wherein the method further comprises:

receiving, from the user device, a third user input associated with selection of the constructed second image processing model for analysis;

dynamically reconstructing the second image processing model by:

extracting the (i) the weigh parameter objects, and (ii) the mapped mutation in hyper parameters; and mapping the (i) the weigh parameter objects, and (ii) the mapped mutation in hyper parameters with a stored hierarchical linked architecture of the first image processing model to construct the second image processing model; and presenting the dynamically reconstructed second image processing model on the display device of the user device.

20. The computerized method of claim 15, wherein storing the second image processing model at the at least one hosted model versioning system repository further comprises:

constructing a pointer link between the weigh parameter objects and a stored hierarchical linked architecture associated with the first image processing model.

* * * * *